US006777101B2

(12) United States Patent
Kegasawa et al.

(10) Patent No.: US 6,777,101 B2
(45) Date of Patent: Aug. 17, 2004

(54) IMAGE-RECEIVING SHEET FOR ELECTROPHOTOGRAPHY

(75) Inventors: Tadahiro Kegasawa, Fujinomiya (JP); Shigehisa Tamagawa, Fujinomiya (JP); Yasuhiro Ogata, Fujinomiya (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 69 days.

(21) Appl. No.: 10/156,840

(22) Filed: May 30, 2002

(65) Prior Publication Data

US 2003/0096130 A1 May 22, 2003

(30) Foreign Application Priority Data

May 30, 2001 (JP) ....................................... 2001-162853
Jun. 11, 2001 (JP) ....................................... 2001-175700
Aug. 31, 2001 (JP) ....................................... 2001-263226

(51) Int. Cl.[7] ............................ B32B 27/10; G03G 7/00
(52) U.S. Cl. ....................... 428/513; 428/483; 428/511; 428/512
(58) Field of Search ................................ 428/511, 512, 428/513, 483

(56) References Cited

U.S. PATENT DOCUMENTS 5,466,519 A * 11/1995 Shirakura et al. ........... 428/323
6,387,478 B2 * 5/2002 Fujimoto .................... 428/215

FOREIGN PATENT DOCUMENTS

| | | |
|---|---|---|
| JP | 5-241365 | 9/1993 |
| JP | 8-211645 | 8/1996 |
| JP | 2000-10327 | 1/2000 |

OTHER PUBLICATIONS

"Saishin Laminate Kako Benran", Chapter 3, p. 51, Jun. 30, 1989.

* cited by examiner

*Primary Examiner*—D. S. Nakarani
(74) *Attorney, Agent, or Firm*—Young & Thompson

(57) ABSTRACT

An image-receiving sheet for electrophotography is provided which is capable of forming an image having excellent gloss and image quality, wherein a polypropylene resin layer is formed in direct contact with both surfaces of a base paper and a toner image-receiving layer is formed on the surface of the surface-polypropylene layer. The polypropylene resin forming the polyproylene resin layers has a melt flow rate (MFR) of 18 to 50 and a density of at least 0.890. The image has an excellent gloss and a high quality and free from the blister formation and also from the easy peeling of the toner image-receiving layer even at a high fixing temperature. A polypropylene resin layer is formed on both surfaces of a base paper and the surface tension of the polypropylene resin layer on the toner image-receiving layer side is controlled at 48 dyne/cm or higher.

12 Claims, 2 Drawing Sheets

IMAGE-RECEIVING SHEET FOR ELECTROPHOTOGRAPHY

BACKGROUND OF THE INVENTION

The present invention relates to an image-receiving sheet for electrophotography, which forms an image excellent in gloss and image quality by an easy method.

The present invention also relates to an image-receiving sheet for electrophotography, which has excellent property of preventing the peeling of a toner image-receiving layer in fixing at a high temperature.

Further, the present invention relates to an image-receiving sheet for electrophotography, which has excellent image quality and gloss and which is protected from the blister formation even in the course of the fixing at a high-temperature.

Image-receiving sheets for electrophotography prepared by forming a polyethylene resin layer in direct contact with the surface of a base paper and forming an image-receiving layer thereon have been known [see, for example, Japanese Patent Unexamined Published Application (hereinafter referred to as "J. P. KOKAI") No. 2000-10327]. As the fixing temperature is elevated or as the fixing time is prolonged, the gloss and quality of the resultant image are generally improved. In addition, the polyethylene resin layer has a high adhesion to a raw paper. However, its thermal resistance is low and, therefore, when the fixing is conducted at a high temperature, blisters are formed at the interface between the raw paper and the polyethylene resin layer to seriously lower the surface gloss and quality of the image on a toner image-receiving layer formed thereon. For preventing the blister formation, for example, a technique of applying a cross-linking resin such as a polyester or polyurethane to a raw paper and then curing the resin by the radiation is proposed in J. P. KOKAI No. Hei 5-241365. The resin layer cured by the radiation has a high heat resistance. However, it has problems in that the production process thereof is complicated, that a complicated and expensive production equipments are needed, and that the productivity thereof is reduced.

On the other hand, an electrophotographic method is employed for output devices of copying machines and personal computers because in this method, dry treatment is employed, the printing speed is high and general papers (plain papers and wood free papers) are usable. However, when image information such as a face or scenery is to be output as a photograph, a specific photographic paper is necessitated because the general papers are poor particularly in the gloss. For improving the gloss, image-receiving sheets for electrophotography, which comprise a base paper and a toner image-receiving layer containing a thermoplastic resin formed on the support were proposed in J. K. KOKAI Nos. Hei 4-212,168 and Hei 8-211,645. However, glossy electrophotographic image-receiving sheets are designed so that a toner image-receiving layer thereof is improved in the heat response (a phenomenon of sharp melt or softening of the image-receiving layer by the fixing heat) at a low temperature and the fixation. Therefore, these sheets have a problem of so-called blocking. As a result, the following problems are caused: When the electrophotographic image-receiving sheets are stored in piles or in the form of a roll before use, the support of an electrophotographic image-receiving sheet is adhered to the toner image-receiving layer of another electrophotographic image-receiving sheet placed below the support. In another case, the support of an electrophotographic image-receiving sheet is adhered to the toner image-receiving layer of another electrophotographic image-receiving sheet placed below the support and, therefore, when the former sheet is taken out from the pile of the sheets, the toner image-receiving layer is peeled out of the support of the latter sheet. It is effective for solving the blocking problem that fine organic and/or inorganic particles are incorporated into at least one of layers constituting the electrophotographic image-receiving sheet on the toner image-receiving layer side of the support or into the toner image-receiving layer. This method is effective for preventing the blocking. However, it also causes a problem that the gloss of the resultant image is reduced.

Further, image-receiving sheets for electrophotography prepared by forming a polyolefin resin layer on a base paper and forming an image-receiving layer thereon have been known [see, for example, J. P. KOKAI No. 2000-10327]. As the fixing temperature is elevated or as the fixing time is prolonged, the gloss and quality of the resultant image are generally improved. However, as stated above, although the polyethylene resin layer has a high adhesion to a raw paper, its thermal resistance is low and, therefore, when the fixing is conducted at a high temperature, blisters are formed at the interface between the raw paper and the polyethylene resin layer to seriously lower the surface gloss and quality of the image on a toner image-receiving layer formed thereon. This is a problem to be solved. A low density polyethylene (LDPE), a high-density polyethylene (HDPE), etc. are practically used as the polyolefin resins for forming the polyolefin resin layers on both sides of a base paper in Examples in the above-described J. P. KOKAI No. 2000-10327. However, the low-density polyethylenes and high-density polyethylenes can be classified into many grades and their melting points vary in a wide range. Various grades of polyethylenes having different melting points are known.

In addition, the thickness of the polyolefin resin layers is generally referred to in the above-described J. P. KOKAI No. 2000-10327. For example, it is described therein that the thickness of the polyolefin resin layer on the image-receiving layer side is preferably 10 to 60 $\mu$m, more preferably 15 to 40 $\mu$m (0.015 to 0.40 mm) and that on the back side is preferably 10 to 50 $\mu$m (0.010 to 0.050 mm), more preferably 15 to 40 $\mu$m (0.015 to 0.40 mm). However, the inventors have found that the blister formation cannot be prevented by only controlling the thickness of the polyolefin resin layer in this range. Namely, the inventors have found that even when only the thickness of the resin layer is controlled in the above-described range, the blister formation cannot be inhibited. In particular, the inventors have found that even when the thickness of the polyolefin resin layer is controlled in this range, the blisters are formed depending on the melting point of the polyolefin resin used and that the blisters are formed particularly in the fixing at a high temperature. The inventors have also found that when an image is formed on the thus obtained image-receiving sheet for electrophotography, the image quality and gloss are lowered.

SUMMARY OF THE INVENTION

First Invention

Figure 1:
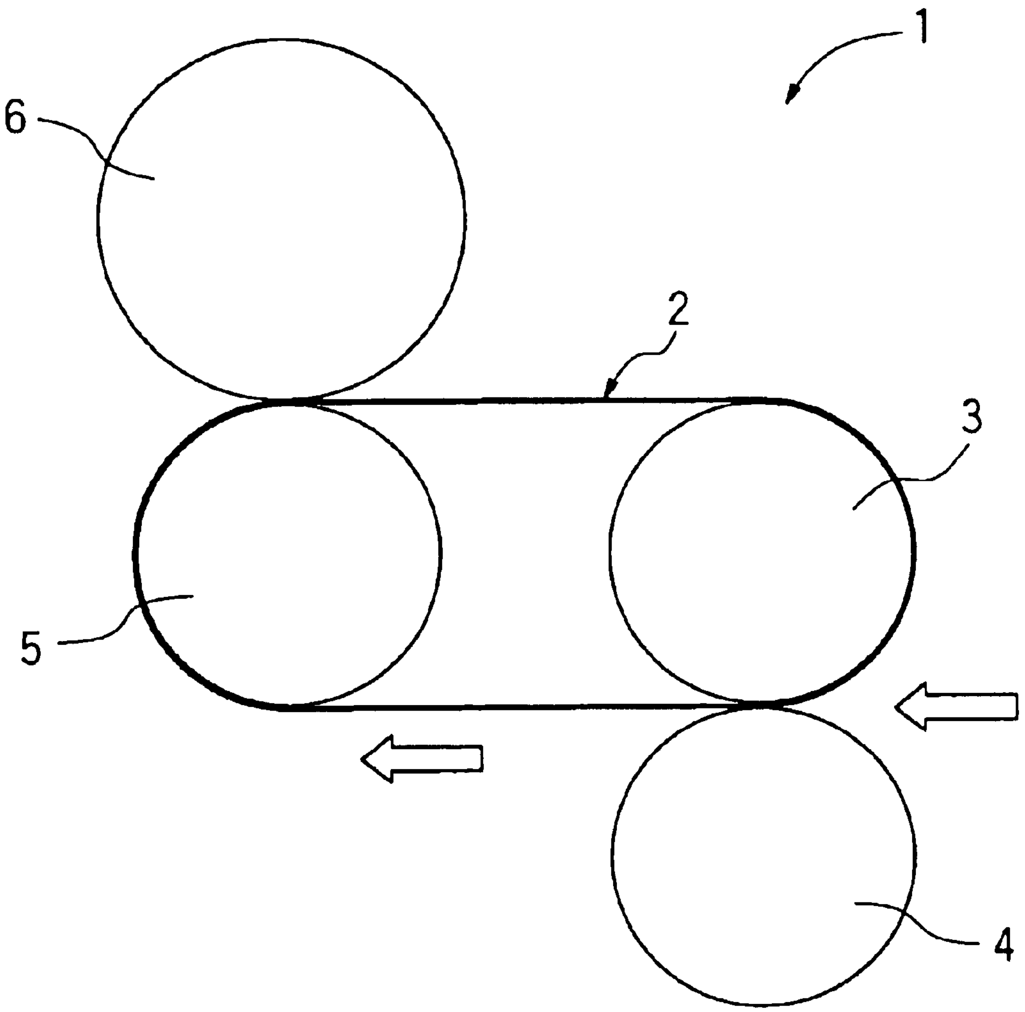
FIG. 1 is a schematic diagram showing a fixing belt system in a printer used in Examples.

The object of the present invention is to provide image-receiving sheets for electrophotography, which form an image excellent in the gloss and quality by an easy method. After intensive investigations made for the purpose of solving the above-described problems, the inventors have found that the problems can be solved by using a polypropylene resin having a melt flow rate (MFR) of 18 to 50 and a density of at least 0.890 as a polypropylene resin layer to be provided in direct contact with both surfaces of a base paper. The present invention has been completed on the basis of this finding. In this connection, J. P. KOKAI No. Hei 8-211,645 discloses an image-carrying material made by forming a plastic layer on both surfaces of a base paper and then forming a toner image-receiving layer on the surface of the plastic layer. Although it is described therein that not only polyethylene but also polypropylene is usable as a material for constituting the plastic layer, only polyethylene is used in Examples and the use of polypropylene is not concretely disclosed therein. As compared with polyethylene resin, the polypropylene resin is considered to have a poor adhesion to the support as described above. It is not concretely stated in J. P. KOKAI No. Hei 8-211,645 that the polypropylene having the specific MFR and density is used for the purpose of improving the heat resistance.

Second Invention

Another object of the present invention is to provide image-receiving sheets for electrophotography, which are excellent in the smoothness (gloss) and usable for the photography and in which a toner image-receiving layer is not easily peeled off even at a high fixing temperature. After intensive investigations made for the purpose of solving the above-described problems, the inventors have found that the problems can be solved by forming a polypropylene resin layer on both surfaces of a base paper and activating the surface of the polypropylene resin layer on the toner image-receiving layer side to control the surface tension at 48 dyne/cm or higher. In this connection, J. P. KOKAI No. Hei 8-211,645 discloses an image-carrying material made by forming a plastic layer on both surfaces of a base paper and then forming a toner image-receiving layer on the surface plastic layer. Although it is described therein that not only polyethylene but also polypropylene is usable as a material for constituting the plastic layer, only polyethylene is used in Examples and the use of polypropylene is not concretely disclosed therein. Further, it is not concretely stated in J. P. KOKAI No. Hei 8-211,645 that the polypropylene resin layer is formed on both surfaces of the base paper. In addition, it is not disclosed or suggested in that specification that the polypropylene resin layer is activated to a surface tension of at least 48 dyne/cm, which has never been proposed in the prior art, for the purpose of keeping the toner image-receiving layer, to be formed thereon, from peeling. It is described in an Example in J. P. KOKAI No. Hei 8-211,645 that the surface of the polyethylene layer is treated by the corona discharge before the toner image-receiving layer is formed. However, this treatment is not an ordinary activation treatment but it is for imparting an ordinary surface tension of about 42 to 45 dyne/cm [refer to lines 10-1, right column, page 51, Chapter 3 of "*Saishin Laminate Kako Benran*" (published in 1989)].

Third Invention

A further object of the present invention is to provide image-receiving sheets for electrophotography, which are capable of forming an image excellent in the quality and surface gloss even by the fixing at a high temperature. After intensive investigations made for the purpose of solving the above-described problems, the inventors have found that the above-described problems can be solved by providing an image-receiving sheet for electrophotography, which comprises a base paper, polyolefin resin layers formed on both sides of the base paper and a toner image-receiving layer(s) formed on one or both of the polyolefin resin layers, wherein the melting point of the polyolefin resin forming the polyolefin resin layers and the thickness of the polyolefin resin layer are selected so as to satisfy the following conditions:

$$(mp-50)^2 \times T > 210 \quad (1)$$

$$T < 0.07 \quad (2)$$

wherein mp represents the melting point (° C.) of the polyolefin resin, and T represents the thickness (mm) of the polyolefin resin layer.

The present invention has been completed on the basis of the above findings.

DESCRIPTION OF THE EMBODIMENTS

Base Paper

The base paper usable for forming the photographic image-receiving sheets of the present invention is raw paper. Pulps usable as the materials for the raw papers are desirably bleached kraft pulps of broadleaf trees (LBKP) because they are capable of improving all of the surface smoothness, rigidity and dimensional stability (curling property) of the raw paper to desirable levels while keeping these properties well-balanced. Further, bleached kraft pulps of needle-leaf trees (NBKP) and sulfite pulps of broad leaf trees (LBSP) are also usable.

For beating the pulps, beaters, refiners, etc. can be used. If necessary, various additives such as fillers, dry strength additives, sizing agents, wet strength additives, fixing agents and pH regulators are added to a pulp slurry (hereinafter referred to as "pulp stock") obtained after the beating of the pulp.

The fillers include, for example, calcium carbonate, clay, kaolin, china clay, talc, titanium oxide, diatomaceous earth, barium sulfate, aluminum hydroxide and magnesium hydroxide.

The dry strength additives include, for example, cationized starch, cationized polyacrylamide, anionized polyacrylamide, amphoteric polyacrylamide and carboxy-modified polyvinyl alcohol.

The sizing agents include, for example, fatty acid salts, rosin, rosin derivatives such as maleinized rosin, paraffin wax, alkylketene dimers, alkenyl succinic anhydride (ASA) and epoxidized fatty acid amides.

The wet strength additives include, for example, polyamine polyamide epichlorohydrin, melamine resin, urea resin and epoxidized polyamide resin.

The fixing agents include, for example, polyvalent metal salts such as aluminum sulfate and aluminum chloride, and cationic polymers such as cationized starch.

The pH regulators include, for example, sodium hydroxide and sodium carbonate.

Other additives are, for example, defoaming agents, dyes, slime controlling agents and fluorescent brightening agents. If necessary, a softening agent or the like can also be used. The softening agents are described in, for example, *Shin-Kami Kako Benran* (edited by Shiyaku Time Co.) (pages 554 to 555) (published in 1980).

Processing solutions used for the surface sizing treatment may contain, for example, a water-soluble high-molecular substance, a sizing agent, a water-resistant substance, a pigment, a pH regulator, a dye, a fluorescent brightening agent or the like. The water-soluble high-molecular substances include, for example, cationized starch, polyvinyl alcohol, carboxy-modified polyvinyl alcohol, carboxymethylcellulose, hydroxyethylcellulose, cellulose sulfate, gelatin, casein, polysodium acrylate, sodium salt of styrene/maleic anhydride copolymer and polysodium styrenesulfonate.

The sizing agents include, for example, petroleum resin emulsion, ammonium salts of alkyl esters of styrene/maleic anhydride copolymer, rosin, higher fatty acid salts, alkyl ketene dimers (AKD) and epoxidized fatty acid amides.

The water-resistant substances include, for example, latex emulsions of styrene/butadiene copolymer, ethylene/vinyl acetate copolymer, polyethylene and vinylidene chloride copolymers: and polyamide polyamine epichlorohydrin.

The pigments include, for example, calcium carbonate, clay, kaolin, talc, barium sulfate and titanium oxide.

The materials for the raw papers include synthetic pulp papers, mixed papers of a natural pulp and a synthetic pulp, and various combined papers in addition to the above-described natural pulp papers.

The thickness of the raw paper, i.e., the base paper, is usually 30 to 500 $\mu$m, preferably 50 to 300 $\mu$m and more preferably 100 to 200 $\mu$m.

For improving the rigidity and dimensional stability (curling property) of the electrophotographic image-receiving sheet, the ratio (Ea/Eb) of the longitudinal Young's modulus (Ea) to the transverse Young's modulus (Eb) is preferably in the range of 1.5 to 2.0. When Ea/Eb value is below 1.5 or above 2.0, the rigidity and curling property of the electrophotographic image-receiving sheet are inclined to be poor to cause troubles in the running property in the carrying step.

It has been known that the toughness of papers is variable depending on the beating method. The elasticity (modulus of elasticity) of the paper produced after the beating can be employed as an important factor of showing the degree of the toughness. In particular, the modulus of elasticity of the paper can be determined according to the following formula by determining the sound velocity in the paper with an ultrasonic oscillation element according to the relationship between the dynamic modulus and density, which show the physical properties of the viscoelastomer, of the paper:

$$E=\rho c^2(1-\nu^2)$$

wherein E represents the dynamic modulus, $\rho$ represents the density, c represents the sound velocity in the paper and $\nu$ represents Poisson's ratio.

Because paper sheets usually have $\nu$ of about 0.2, the dynamic modulus can also be calculated according to the following formula without a significant difference:

$$E=\rho c^2$$

Namely, the modulus of elasticity can be easily determined from the density of the paper and the sound velocity. For determining the sound velocity in the above formula, various known devices such as Sonic Tester SST-110 (a product of Nomura Shoji K. K.) can be used.

The basis weight of the base paper is in the range of, for example, 50 to 250 g/m$^2$, preferably 100 to 180 g/m$^2$.

Preferred examples of the base papers include wood free papers and papers described in, for example "Shashin Kogaku no Kiso (Fundamentals of Photographic Engineering)—Gin'en Shashin-Hen (Edition of Silver salt Photos)—"(edited by Nippon Shashin Gakkai and published by Corona Co., Ltd. in 1979), pages 223 to 240.

Two or more sheets of the base paper may be used together. Both or one surface of the base paper is preferably activated by corona discharge treatment, flame treatment, glow discharge treatment or plasma treatment for the purpose of improving the adhesion to a polypropylene resin layer which will be described below to be applied to the base paper.

Polypropylene Resin Layer

First Invention

As the first embodiment, the polypropylene resin constituting the polypropylene resin layer formed in direct contact with both surfaces of the base paper has a melt flow rate (MFR) of at least 18 g/10 min, preferably at least 25 g/10 min and particularly preferably at least 35 g/10 min. When an MFR is below 18 g/10 min, the polypropylene resin layer cannot resist to a foaming pressure due to water contained in the base paper in the heat fixing step because the adhesion thereof to the base paper is low, and the blisters are formed to cause the defects on the surface. Although the upper limit of MFR is not particularly provided, it is, for example, 50 g/10 min, preferably 48 g/10 min, and particularly preferably about 45 g/10 min. When it exceeds 50 g/10 min, the film width might be changed, the straightness of the edge of the polypropylene resin layer might be reduced or neck-in might be caused when this layer is bonded by the lamination molding. By thus forming the polypropylene resin layer on both surfaces of the base paper, water absorption can be prevented and, as a result, the elongation on both surfaces of the electrophotographic image-receiving sheet can be uniformly controlled to keep the sheet from the cracking and curling.

The density of the polypropylene resin to be used for forming the polypropylene resin layer is, for example, at least 0.890 g/cm$^3$, preferably at least 0.900 g/cm$^3$ and more preferably at least 0.905 g/cm$^3$. A density of lower than 0.890 g/cm$^3$ is not preferred for preventing the fixing roll from being stained with the resin or from the blister formation. The upper limit of the density is usually 0.910 g/cm$^3$.

The thickness of the polypropylene resin layer is usually 5 to 50 $\mu$m, preferably 10 to 30 $\mu$m.

The polypropylene resin layer on the surface (the toner image-receiving layer side) of the base paper preferably forms the mirror surface (glossy surface). On the other hand, the polypropylene resin layer on the back surface of the base paper is preferably the mat surface. The arithmetic mean roughness (Ra) of the mat surface is preferably 20 $\mu$m or below, more preferably 10 $\mu$m or below and particularly preferably 8 $\mu$m or below. In the roughness determination tests, Ra is, for example, 1 to 20 $\mu$m and preferably 5 to 10 $\mu$m.

The polypropylene resin layer can be directly formed on the base paper preferably by the melt-extrusion or lamination on the base paper surface.

A laminate of two or more polypropylene resin layers can be formed on each surface of the base paper. In this case, a laminate of plural layers, for example, two or more layers, of the same or different polypropylene resins can be formed by the co-melt extrusion.

The polypropylene resin layer is substantially free of any pigment or filler. Even when a pigment or filler is contained therein, the amount thereof is preferably not larger than, for example, 15% by mass based on the polypropylene resin layer. When the pigment content is higher than 15% by mass, the electrophotographic image-receiving paper is easily elongated by the moisture absorption after the receiving of the image to cause a stress between the image-receiving layer and the toner layer, thereby causing the curling and the crack formation in the toner layer. Thus, pigments or the like can be used so far as such problems are not caused. However, it is particularly preferred that the polypropylene resin layer is completely free from the pigments or the like.

Second Invention

Polypropylene Resin Layer

In the second invention, the polypropylene resin constituting the polypropylene resin layers on both surfaces of the base paper has a melt flow rate (MFR) of preferably at least 18 g/10 min, more preferably at least 25 g/10 min and particularly preferably at least 35 g/10 min. By controlling MFR at 18 g/10 min or higher, the adhesion to the base paper can be improved, the polypropylene resin layer can resist to a foaming pressure due to water contained in the base paper in the heat fixing step, the blister formation can be prevented and the defects on the surface can be prevented. Although the upper limit of MFR is not particularly provided, it is, for example, 50 g/10 min, preferably 48 g/10 min, and particularly preferably about 45 g/10 min. When it exceeds 50 g/10 min, the film width might be changed, the straightness of the edge of the polypropylene resin layer might be reduced or neck-in might be caused when this layer is bonded by the lamination molding. By thus forming the polypropylene resin layer on both surfaces of the base paper, water absorption can be prevented and, as a result, the elongation on both surfaces of the electrophotographic image-receiving sheet can be uniformly controlled to keep the sheet from the cracking and curling.

The density of the polypropylene resin to be used for forming the polypropylene resin layer is, for example, at least 0.895 g/cm$^3$, preferably at least 0.900 g/cm$^3$. The density of at least 0.895 g/cm$^3$ is preferred for preventing the fixing roll from being stained with the resin. The upper limit of the density is usually 0.910 g/cm$^3$.

The thickness of the polypropylene resin layer is usually 5 to 50 $\mu$m, preferably 10 to 30 $\mu$m.

The polypropylene resin layer on the surface (the toner image-receiving layer side) of the base paper preferably forms the mirror surface (glossy surface). On the other hand, the polypropylene resin layer on the back surface of the base paper is preferably the mat surface.

The polypropylene resin layer can be formed on the base paper preferably by melt-extrusion or lamination on the base paper surface.

A laminate of two or more polypropylene resin layers can be formed on each surface of the base paper. In this case, a laminate of plural layers, for example, two or more layers, of the same or different polypropylene resins can be formed by the co-melt extrusion.

The polypropylene resin layer is substantially free of any pigment or filler. Even when a pigment or filler is contained therein, the amount thereof is preferably not larger than, for example, 20% by mass based on the polypropylene resin layer. When the pigment content is higher than 20% by mass, the electrophotographic image-receiving paper is easily elongated by the moisture absorption after the receiving of the image to cause a stress between the image-receiving layer and the toner layer, thereby causing the curling and the crack formation in the toner layer. Thus, pigments or the like can be used so far as such problems are not caused. However, it is particularly preferred that the polypropylene resin layer is completely free from the pigments or the like.

The surface tension of the polypropylene resin layer forming the toner image-receiving layer, which will be described below, is at least 48 dyne/cm, preferably at least 50 dyne/cm. When the surface tension thereof is below 48 dyne/cm, the problem of the peeling of the toner image-receiving layer in the fixing at a high temperature cannot be completely solved. The maximum surface tension, which varies depending on the apparatus for the corona discharge treatment, is usually about 54 dyne/cm.

The surface tension can be preferably imparted by the corona discharge treatment. In the present invention, the object of the invention could be attained by the activation to a larger extent than that of the ordinary activation. For example, when the surface tension usually employed in the corona discharge treatment of the polyethylene layer in the prior art, concretely about 42 to 45 dyne/cm, is employed, the effect of preventing the peeling between the polypropylene resin layer and the toner image-receiving layer is substantially not obtained. The surface tension of at least 48 dyne/cm is over the range which was supposed by those skilled in the prior art.

For the activation to a surface tension of at least 48 dyne/cm, the corona discharge treatment of the surface of the polypropylene resin layer is conducted with an electric power of at least 0.06 kg/m$^2$.

The corona discharge treatment can be conducted twice or more times.

A subbing layer may be formed on the polypropylene resin layer having thus controlled surface tension before the formation of the toner image-receiving layer for the purpose of further improving the adhesion to the toner image-receiving layer.

For forming the subbing layer, a water-soluble polymer such as gelatin, polyacrylamide (PAM), carboxymethylcellulose (CMC), hydroxyethylcellulose (HEC) or methylcellulose (MC) can be used. Such a polymer, in the form of an aqueous solution thereof, can be applied to the surface of the polypropylene resin layer.

The aqueous polymer solution to be used has a solid polymer content of 0.1 to 10% by mass, preferably 0.5 to 5% by mass.

Third Invention

Polyolefin Resin Layer

In the third invention, the polyolefins constituting the polyolefin resin layers on both surfaces of the base paper are polymers or copolymers of olefins such as ethylene, propylene and butylene. Typical polyolefin resins usable herein are polyethylene (PE) resin and polypropylene (PP) resin. These polyolefin resins are also usable in the form of a mixture of them.

The polyethylene resins are preferably low-density polyethylene resin (LDPE), high-density polyethylene resin (HDPE) and linear low density polyethylene resin (LLDPE). The polypropylene resins usable herein are those of various grades.

The melting points of the polyolefin resins such as the polyethylene resins and polypropylene resins must have a melting point satisfying the following formula (1) in the relationship between the melting point and the thickness of the polyolefin resin layer:

$$(mp-50)^2 \times T > 210 \quad (1)$$

wherein mp represents the melting point (° C.) of the polyolefin resin, and T represents the thickness (mm) of the polyolefin resin layer.

When the value of the left side of the above equation (1) is 210 or below, blisters are formed to seriously damage the image quality and gloss. The upper limit of the value of the left side would be, for example, 500.

The thickness of the polyolefin resin layer must be less than 0.07 mm as shown in the following formula (2):

$$T < 0.07 \quad (2)$$

wherein T represents the thickness (mm) of the polyolefin resin layer.

The thickness of the polyolefin resin layer is preferably less than 0.04 mm. When the thickness of the polyolefin resin layer is 0.07 mm or more, the toner transfer efficiency is lowered and the well-balanced density cannot be obtained. The lower limit of the thickness of the polyolefin resin layer would be practically about 0.01 mm.

The density of the polyolefin resin to be used for forming the polyolefin resin layer is not particularly limited. The density of polyethylene resin is, for example, about 0.920 to 0.980 g/cm$^3$, preferably about 0.940 to 0.970 g/cm$^3$, and that of polypropylene resin is, for example, about 0.895 to 0.910 g/cm$^3$, preferably about 0.900 to 0.910 g/cm$^3$. The density in this range is preferred for preventing the fixing roll from being stained with the resin.

The polyolefin resin layer on the surface (the toner image-receiving layer side) of the base paper preferably forms the mirror surface (glossy surface). On the other hand, the polyolefin resin layer on the back surface of the base paper is preferably the mat surface.

The polyolefin resin layer can be formed on the base paper preferably by melt-extrusion or lamination on the base paper surface.

A laminate of two or more polyolefin resin layers can be formed on each surface of the base paper so far as the thickness of the laminate is within the predetermined range. In this case, a laminate of plural layers, for example, two layers, of the same or different polyolefin resins can be formed by the co-melt extrusion.

Preferably, the polyolefin resin layer is substantially free of any pigment or filler. Even when the pigment or filler is contained therein, the amount thereof is preferably not larger than, for example, 20 mass % based on the polyolefin resin layer. When the pigment content is higher than 20 mass %, the electrophotographic image-receiving paper is easily elongated by the moisture absorption after the receiving of the image to cause a stress between the image-receiving layer and the toner layer, thereby causing the curling and the crack formation in the toner layer. Thus, pigments or the like can be used so far as such problems are not caused. However, it is particularly preferred that the polyolefin resin layer is completely free from the pigments or the like.

The surface tension of the polyolefin resin layer forming the toner image-receiving layer is preferably previously increased by, for example, corona discharge treatment. Particularly when the polyolefin resin layer is polypropylene resin layer, the surface tension thereof is to be increased to at least 48 dyne/cm, preferably at least 50 dyne/cm by the corona discharge treatment or the like.

The corona discharge treatment can be conducted twice or more times.

A subbing layer may be formed on the polyolefin resin layer on the base paper before the formation of the toner image-receiving layer for the purpose of further improving the adhesion to the toner image-receiving layer.

For forming the subbing layer, a water-soluble polymer such as gelatin, polyacrylamide (PAM), carboxymethylcellulose (CMC), hydroxyethylcellulose (HEC) or methylcellulose (MC) can be used. Such a polymer, in the form of an aqueous solution thereof, can be applied to the surface of the polypropylene resin layer.

The aqueous polymer solution to be used has a solid polymer content of 0.1 to 10% by mass, preferably 0.5 to 5% by mass.

Toner Image-Receiving Layer

The toner image-receiving layer is provided on the polyolefin or polypropylene resin layer formed on the surface of the base paper in the present invention.

The toner image-receiving layer used in the present invention has functions of receiving an image-forming toner from a developing drum or an intermediate transfer medium by (static) electricity, pressure, etc. in the transferring step and fixing the image by heat, pressure, etc. in the fixing step.

The toner image-receiving layer used in the present invention can contain various additives in addition to the thermoplastic resin so far as the additives do not impair the function of the toner image-receiving layer.

The thickness of the toner image-receiving layer is at least a half, preferably 1 to 3 times as much as the particle diameter of the toner used. The thickness of the toner image-receiving layer is preferably as described in J. P. KOKAI Nos. Hei 5-216,322 and 7-301,939. Concretely, the thickness is, for example, 1 to 50 $\mu$m, preferably 2 to 30 $\mu$m, much preferably 5 to 15 $\mu$m.

The toner image-receiving layer preferably has one, more preferably two or more and most preferably all of the following physical properties:

(1) The toner image-receiving layer has a Tg (glass transition temperature) in the range of 30° C. to toner Tg+20° C.

(2) The toner image-receiving layer has T½ (½ method softening point) of 60 to 200° C., preferably 80 to 170° C. The ½ method softening point is defined to be a temperature at which the difference between piston stroke at the initiation of the flowing and that at the end of the flowing is ½, when heat increase is caused at a prescribed constant rate using a prescribed device and condition while a prescribed extrusion pressure is imposed, after a thermal inertia time of, for example, 300 sec. at an initial set temperature (for example, 50° C.).

(3) Tfb (temperature at which the flowing begins) of the toner image-receiving layer is 40 to 200° C. Preferably Tfb of the toner image-receiving layer is not higher than toner Tfb+50° C.

(4) Temperature at which the viscosity of the toner image-receiving layer is $1\times10^5$ CP is not lower than 40° C. and lower than that of the toner.

(5) The storage elastic modulus (G') at a fixing temperature of the toner image-receiving layer is $1\times10^2$ to $1\times10^5$ Pa and the loss elastic modulus (G") thereof is $1\times10^2$ to $1\times10^5$ Pa.

(6) The loss tangent (G"/G'), which is the ratio of the loss elastic modulus (G") to the storage elastic modulus (G') at a fixing temperature of the toner image-receiving layer, is 0.01 to 10.

(7) The storage elastic modulus (G') at a fixing temperature of the toner image-receiving layer is −50 to +2500 as compared with the storage elastic modulus (G") at the fixing temperature of the toner.

(8) The inclination on the image-receiving layer of the molten toner is not higher than 50°, particularly not higher than 40°.

The toner image-receiving layers are preferably those satisfying physical properties described in Japanese Patent No. 2,788,358 and J. P. KOKAI Nos. Hei 7-248,637, Hei 8-305,067 and Hei 10-239,889.

The physical property of above item (1) can be determined with a differential scanning calorimeter (DSC). The physical properties of above items (2) to (4) can be determined with, for example, Flow Tester CFT-500 or 500D (Shimadzu Corporation). The physical properties of above items (5) to (7) can be determined with a rotary rheometer (such as Dinamic Analyzer RADII of Rheometric Co.). The physical property of above item (8) can be determined by a method described in J. P. KOKAI No. Hei 8-334,916 with a contact angle meter of Kyowa Kaimen Kagaku K. K.

The thermoplastic resins usable for the toner image-receiving layer of the present invention are not particularly limited so far as they are capable of being deformed at the fixing temperature and also capable of receiving the toner. The thermoplastic resin used for the toner image-receiving layer preferably belongs to the same group as that of a resin used as the binder for the toner. Because polyester resins, styrene/acrylic acid ester copolymers, styrene/methacrylic acid ester copolymers, etc. are used for forming the toner in many cases, the thermoplastic resins used for the toner image-receiving layer in the present invention are preferably polyester resins, styrene/acrylic acid ester copolymers, styrene/methacrylic acid ester copolymers, etc.

Examples of the thermoplastic resins are as follows:

(A) Polyolefin resins such as polyethylene resin and polypropylene resin; copolymer resins composed of an olefin such as ethylene or propylene and another vinyl monomer; and acrylic resin, (B) Thermoplastic resins having an ester linkage:

Polyester resins obtained by the condensation of a dicarboxylic acid component such as terephthalic acid, isophthalic acid, maleic acid, fumaric acid, phthalic acid, adipic acid, sebacic acid, azelaic acid, abietic acid, succinic acid, trimellitic acid or pyromellitic acid (such a dicarboxylic acid component may be substituted with a sulfonic acid group, carboxyl group or the like) with an alcohol component such as ethylene glycol, diethylene glycol, propylene glycol, bisphenol A, a diether derivative of bisphenol A (such as 2 ethylene oxide adduct of bisphenol A or 2 propylene oxide adduct of bisphenol A), bisphenol S, 2-ethylcyclohexyldimethanol, neopentyl glycol, cyclohexyldimethanol or glycerol (such an alcohol component may be substituted with a hydroxyl group or the like); polyacrylic acid ester resins or polymethacrylic acid ester resins such as polymethyl methacrylate, polybutyl methacrylate, polymethyl acrylate and polybutyl acrylate; polycarbonate resins; polyvinyl acetate resins; styrene acrylate resins; styrene/methacrylic acid ester copolymer resins and vinyltoluene acrylate resins. Concrete examples of them are those described in J. P. Kokai Nos. Sho 59-101,395, Sho 63-7,971, Sho 63-7,972, Sho 63-7,973 and Sho 60-294,862. Commercially available thermoplastic resins usable herein are, for example, Vylon 290, Vylon 200, Vylon 280, Vylon 300, Vylon 103, Vylon GK-140 and Vylon GK-130 (products of Toyobo Co., Ltd.); Tafton NE-382, Tafton U-5, ATR-2009 and ATR-2010 (products of Kao Corporation); Erither UE 3500, UE 3210 and XA-8153 (products of Unitika Ltd.); and Polyester TP-220 and R-188 (products of The Nippon Synthetic Chemical Industry Co., Ltd.), (C) Polyurethane resin, etc., (D) Polyamide resin, urea resin, etc., (E) Polysulfone resin, etc., (F) Polyvinyl chloride resin, polyvinylidene chloride resin, vinyl chloride/vinyl acetate copolymer resin, vinyl chloride/vinyl propionate copolymer resin, etc.

(G) Polyol resins such as polyvinyl butyral; and cellulose resins such as ethyl cellulose resin and cellulose acetate resin, and (H) Polycaprolactone resin, styrene/maleic anhydride resin, polyacrylonitrile resin, polyether resins, epoxy resins and phenolic resins.

The thermoplastic resins may be used either alone or in the form of a mixture of them.

The thermoplastic resin is incorporated in an amount of usually at least 20% by mass, preferably 30 to 100% by mass, based on the toner image-receiving layer.

The thermoplastic resins usable for forming the toner image-receiving layer are preferably those having physical properties described in J. P. KOKOKU Nos. Hei 5-127,413, Hei 8-194,394, Hei 8-334,915, Hei 8-334,916, Hei 9-171,265 and Hei 10-221,877.

The thermoplastic resins used for forming the toner image-receiving layer of the present invention are those capable of satisfying the requirement of the above-described physical properties of the image-forming layer after the formation of the image-receiving layer. More preferred thermoplastic resins are those capable of satisfying the requirement of the above-described physical properties of the toner image-receiving layer even when they are used alone. Two or more resins having different physical properties can be used together.

The thermoplastic resin used for forming the toner image-receiving layer is preferably the one having a molecular weight larger than that of the thermoplastic resin used for forming the toner. However, this relationship in the molecular weight is not always desirable depending on the relationship between the thermodynamic properties of the toner resin and those of the thermoplastic resin used for forming the toner image-receiving layer. For example, when the softening temperature of the thermoplastic resin used for forming the toner image-receiving layer is higher than that of the toner resin, it is occasionally preferred that the molecular weights of these resins are equal or that of the thermoplastic resin used for forming the toner image-receiving layer is lower.

It is also preferred to use a mixture of resins having the same compositions but different average molecular weight as the thermoplastic resin for forming the toner image-receiving layer. The molecular weights of the thermoplastic resins used for forming the toner are preferably those described in J. P. KOKAI No. Hei 8-334,915.

The molecular weight distribution of the thermoplastic resin used for forming the toner image-receiving layer is preferably broader than that of the thermoplastic resin used for forming the toner.

The thermoplastic resins used for forming the toner image-receiving layer may be soluble in water. The water-soluble thermoplastic resins are not particularly limited in the composition, bonding structure, molecular structure, molecular weight, molecular weight distribution, form, etc. so far as they are soluble in water. A necessary condition for obtaining a water-soluble thermoplastic resin is, for example, that the resin has a water-solubilizing group such as hydroxyl group, a carboxylic acid group, an amino group, an amido group or an ether group.

Examples of the water-soluble thermoplastic resins are those given in Research Disclosure No. 17,643 (page 26), No. 18,716 (page 651) and No. 307,105 (pages 873 to 874), and J. P. KOKAI No. Sho 64-13,546 (pages 71 to 75). Concretely, the water-soluble thermoplastic resins usable herein are, for example, vinylpyrrolidone/vinyl acetate copolymer, styrene/vinylpyrrolidone copolymer, styrene/maleic anhydride copolymer, water-soluble polyesters, water-soluble polyurethane, water-soluble nylon and water-soluble epoxy resin.

When a water-insoluble thermoplastic resin is used for forming the toner image-receiving layer, for example, an aqueous dispersion thereof is applied to the polyolefin resin layer. The aqueous dispersion is suitably selected from among acrylic resin emulsion, polyvinyl acetate emulsion, SBR (styrene/butadiene/rubber) emulsion, polyester resin emulsion, polystyrene resin emulsion, urethane resin emulsion, etc. A combination of two or more of them is also usable. When a gelatin is used, it can be selected from among gelatin treated with lime, gelatin treated with an acid and so-called delimed gelatin having a reduced calcium content.

When the binder for the toner is a polyester resin, the resin for forming the toner image-receiving layer is preferably a polyester resin.

Polyester resins available on the market are, for example, Vylon 290, Vylon 200, Vylon 280, Vylon 300, Vylon 103, Vylon GK-140 and Vylon GK-130 (products of Toyobo Co., Ltd.); Tafton NE-382, Tafton U-5, ATR-2009 and ATR-2010 (Kao Corporation); Erither UE3500, UE3210 and XA-8153 (products of Unitika Ltd.); and Polyester TP-220 and R-188 (products of The Nippon Synthetic Chemical Industry, Co., Ltd.). The acrylic resins available on the market are, for example, Dianal SE-5437, SE-5102, SE-5377, SE-5649, SE-5466, SE-5482, HR-169, 124, HR-1127, HR-116, HR-113, HR-148, HR-131, HR-470, HR-634, HR-606, HR-607, LR-1065, 574, 143, 396, 637, 162, 469, 216, BR-50, BR-52, BR-60, BR-64, BR-73, BR-75, BR-77, BR-79, BR-80, BR-83, BR-85, BR-87, BR-88, BR-90, BR-93, BR-95, BR-100, BR-101, BR-102, BR-105, BR-106, BR-107, BR-108, BR-112, BR-113, BR-115, BR-116 and BR-117 (products of Mitsubishi Rayon Co., Ltd.); Eslec P SE-0020, SE-0040, SE-0070, SE-0100, SE-1010 and SE-1035 (products of Sekisui Chemical Co., Ltd.); and ST95 and ST120 (products of Sanyo Chemical Industries, Ltd.); and FM601 (a product of Mitsui Kagaku). Preferred polyester emulsions available on the market are, for example, Vironal MD-1250 and MD-1930 (products of Toyobo Co,. Ltd.); Plascoat Z-446, Z-465 and RZ-96 (products of Goo Chemical Industries Co., Ltd.); ES-611 and ES-670 (products of Dainippon Ink and Chemicals, Inc.); and Pesresin A-160P, A-210, A-515GB and A-620 (products of Takamatsu Yushi).

The film-forming temperature of the thermoplastic resin is preferably not lower than room temperature for the storage before the printing and it is preferably not higher than 100° C. for the fixing of the toner particles.

The toner image-receiving layer used in the present invention may contain various additives for improving the thermodynamic properties of this layer, in addition to the thermoplastic resin. The additives include, for example, plasticizers, slip agents or releasing agents, fillers, crosslinking agents, emulsifying agents and dispersing agents.

As the plasticizers, well-known plasticizers for resins are usable without any limitation. The plasticizers have a function of controlling the fluidization or softening of the toner image-receiving layer by heat and/or pressure in the step of fixing the toner.

The plasticizers can be selected with reference to "*Kagaku Binran* (Handbook of Chemistry)" (edited by Nihon Kagaku-kai and published by Maruzen Co., Ltd.), "*Kaso-zai—Sono Riron to Ouyou*—(Plasticizers—The Theory and Application Thereof—)" (edited by Koichi Murai and published by Saiwai Book Publishing Co.), "*Kasozai no Kenkyu* (Study of Plusticizers), Part 1 and Part 2 (edited by Kobunshi Kagaku Kyokai", and "Handbook, Chemicals to be Incorporated into Rubber-Plastic" (edited by Rubber Digest Co.).

The plasticizers include those described as high-boiling organic solvents and thermal solvents; esters described in, for example, J. P. KOKAI Nos. Sho 59-83,154, 59-178,451, 59-178,453, 59-178,454, 59-178,455, 59-178,457, 62-174,754, 62-245,253, 61-209,444, 61-200,538, 62-9,348, 62-30,247, 62-136,646, 62-174,754, 62-245-253, 61-209,444, 61-200,538, 62-8,145, 62-9,348, 62-30,247 and 62-136,646 and J. P. KOKAI No. Hei 2-235694 (such as phthalic acid esters, phosphoric acid esters, fatty acid esters, abietic acid esters, adipic acid esters, sebacic acid esters, azelaic acid esters, benzoic acid esters, butyric acid esters, epoxidized fatty acid esters, glycolic acid esters, propionic acid esters, trimellitic acid esters, citric acid esters, sulfonic acid esters, carboxylic acid esters, succinic acid esters, maleic acid esters, fumaric acid esters, phthalic acid esters and stearic acid esters), amides (such as fatty acid amides and sulfoamides), ethers, alcohols, lactones and polyethyleneoxy compounds.

The plasticizers are usable in the form of a mixture with the resin.

Polymers having a relatively low molecular weight can be used as the plasticizer. In this case, the molecular weight of the polymer is preferably lower than that of the binder resin to be plasticized. The molecular weight is not higher than 15,000, preferably not higher than 5,000. When a polymer plasticizer is to be used, it is preferably a polymer belonging to the same group as that of the binder resin to be plasticized. For the plasticization of a polyester resin, a polyester of a low molecular weight is preferred. Oligomers are also usable as the plasticizer.

In addition to the above-described compounds, commercially available plasticizers are usable. They include, for example, Adecacizer PN-170 and PN-1430 (Asahi Denka Kogyo K. K.); PARAPLEX-G-25, G-30 and G-40 (C. P. HALL Co.); and Ester Gum 8L-JA, Ester R-95, Pentalin 4851, FK115, 4820, 830, Luizol 28-JA, Picolastic A75, Picotex LC and Crystalex 3085 (Rika Hercules).

The plasticizer is optionally usable for relieving the stress or strain caused when the toner particles are embedded in the toner image-receiving layer (such as physical strains caused by elastic power, viscosity or the like, and strains caused by material balance of the molecule, main chain of binder, pendant part, etc.).

The plasticizer may be microscopically dispersed in the toner image-receiving layer or microscopically phase-separated in island-sea-type, or it may be thoroughly mixed with another component such as a binder to form a solution.

The plasticizer is preferably used in an amount of, for example, 0.001 to 90% by mass, preferably 0.1 to 60% by mass, and particularly preferably 1 to 40% by mass, based on the toner image-receiving layer.

The plasticizer is usable also for the purposes of controlling the slipping property (improvement in the transferability by the reduction in friction), improving the offset in the fixing part (peeling of the toner or layer to the fixing part) and control of the curl balance and control of the electrification (formation of toner electrostatic image).

The slip agent or releasing agent usable, if necessary, in the present invention are used for the purpose of keeping the electrophotographic image-receiving sheet of the present invention from adhering to the fixing/heating member in the fixing step. In particular, 180° peeling strength of the toner image-receiving layer at a fixing temperature to a fixing member is preferably not higher than 0.1 N/25 mm, more preferably not higher than 0.041 N/25 mm. The 180° peeling strength can be determined according to a method of JIS K 6887 by using a surface material of the fixing member.

The slip agents or releasing agents usable for the electrophotographic image-receiving sheet of the present invention are, for example, sodium higher alkylsulfates, higher alcohol/higher fatty acid esters, Carbowax, higher alkyl phospholic acid esters, silicone compounds, modified silicones and cured silicones.

Polyolefin waxes, fluorine oils, fluorine waxes, carnauba wax, microcrystalline wax and silane compounds are also preferred.

The slip agents and releasing agents usable herein are described in U.S. Pat. Nos. 2,882,157, 3,121,060 and 3,850,640; French Patent No. 2,180,465; British Patent Nos. 955,061, 1,143,118, 1,263,722, 1,270,578, 1,320,564, 1,320,757, 2,588,765, 2,739,891, 3,018,178, 3,042,522, 3,080,317, 3,082,087, 3,121,060, 3,222,178, 3,295,979, 3,489,567, 3,516,832, 3,658,573, 3,679,411 and 3,870,521; J. P. KOKAI No. Sho 49-5,017, 51-141,623, 54-159,221 and 56-81,841; and Research Disclosure No. 13,969.

The amount of the slip agent or releasing agent used is 5 to 500 mg/m$^2$, preferably 10 to 200 mg/m$^2$. When an oil for preventing the offset to the fixing member in the fixing part is not used or, in other words, in case of so-called oilless fixing, the amount of the slip agent or releasing agent used is, for example, 30 to 3,000 mg/m$^2$, preferably 100 to 1,500 mg/m$^2$.

Because waxy slip agent or releasing agent is scarcely soluble in organic solvents, it is preferred that an aqueous dispersion thereof is prepared and then a dispersion thereof with a thermoplastic resin solution is prepared and used. Wax slip agent or releasing agent is present in the form of fine particles in the thermoplastic resin. In this case, the amount of the slip agent is 5 to 10,000 mg/m$^2$, preferably 50 to 5,000 mg/m$^2$.

The slip agents or releasing agents are, for example, silicon compounds, fluorine compounds and waxes.

As the slip agents or releasing agents, there can be generally used compounds described in "Kaitei, Wax no Seishitsu to Oyo (Properties and Application of Waxes, Revised Edition)" (published by Saiwai Shobo) and "Silicone Handbook" published by The Nikkan Kogyo Shinbun Ltd. Further, silicone compounds, fluorine compounds and waxes described in the following specifications are preferred: J. P. KOKOKU Nos. Sho 59-38,581 and Hei 4-32,380; J. Patent Nos. 2,838,498 and 2,949,558; J. P. KOKAI Nos. Sho 50-117,433, 52-52,640, 57-148,755, 61-62,056, 61-62,057 and 61-118,760; and J. P. KOKAI Nos. Hei 2-42,451, 3-41,465, 4-212,175, 4-214,750, 4-263,267, 5-34,966, 5-119,514, 6-59,502, 6-161,150, 6-175,396, 6-219,040, 6-230,600, 6-295,093, 7-36,210, 7-43,940, 7-56,387, 7-56,390, 7-64,335, 7-199,681, 7-223,362, 7-287,413, 8-184,992, 8-227,180, 8-248,671, 8-248,799, 8-248,801, 8-278,663, 9-152,739, 9-160,278, 9-185,181, 9-319,139, 9-319,143, 10-20,549, 10-48,889, 10-198,069, 10-207,116, 11-2,917, 11-44,969, 11-65,156, 11-73,049 and 11-19,454. A combination of two or more of these compounds can also be used.

Examples of the silicon compounds include silicone oils such as non-denatured silicone oils (such as dimethylsiloxane oil, methyl hydrogen silicone oil, phenyl methyl silicone oil, and commercial products such as KF-96, KF-96L, KF-96H, KF-99, KF-50, KF-54, KF-56, KF-965, KF-968, KF-994, KF-995, HIVAC F-4 and F-5 (Shin-Etsu Chemical Co., Ltd.); and SH200, SH203, SH490, SH510, SH550, SH 710, SH704, SH705, SH7028A, SH7036, SM7060, SM7001, SM7706, SH7036, SH8710, SH1107 and SH8627 (Toray Dow Corning Silicone Co.).

The fluorine compounds include fluorine oils [commercial products: Daifloyl #1, #3, #10, #20, #50 and #100 and Unidyn TG-440, TG-452, TG-490, TG-560, TG-561, TG-590, TG-652, TG-670U, TG-991, TG-999, TG-3010, TG-3020 and TG-3510 (Daikin industries, Ltd.); MF-100, MF-110, MF-120, MF-130, MF-160 and MF-160E (Tohchm Products); Surfuron S-111, S-112, S-113, S-121, S-131, S-132, S-141 and S-145 (Asahi Glass Co., Ltd.); and FC-430 and FC-431 (Mitsui Fluorochemical)]; fluorine rubbers [LS63U (Toray Dow Corning Silicone Co.); fluorine modified resins [Modipar F200, F220, F600, F2020 and F3035 (Nippon Oils and Fats Co., Ltd.); and Diaromer FF203 and FF204 (Dainichiseika Colour & Chemicals Mfg. Co., Ltd.).

The waxes include petroleum waxes such as paraffin waxes [Paraffin Wax 155, 150, 140, 135, 130, 125, 120 and 115, HNP-3, HNP-5, HNP-9, HNP-10, HNP-11, HNP-12, HNP-14G, SP-0160, SP-0145, SP-1040, SP-1035, SP-3040, SP-3035, NPS-8070, NPS-L-70, OX-2151, OX-2251, EMUSTAR-0384 and EMUSTAR-0136 (Nippon Seiro Co., Ltd.); Serozole 686, 428, 651-A, A, H-803, B-460, E-172, 866, K-133, Hydrin D-337 and E-139 (Chukyo Yushi); and 125° paraffin, 125° FD, 130° paraffin, 135° paraffin, 135° H, 140° paraffin, 140° N, 145° paraffin and paraffin wax M (Nisseki Mitsubishi Oil Co., Ltd.)].

The slipping agents or releasing agents incorporated, if necessary, into the toner image-receiving layer of the present invention include derivatives, oxides, purified products and mixtures of those described above. They may have a reactive substituent.

In the present invention, the slip agent or releasing agent is used in an amount of, for example, 0.1 to 10% by mass, preferably 0.3 to 8.0% by mass, and particularly preferably 0.5 to 5.0% by mass, based on the toner image-receiving layer.

As the organic or inorganic fillers which can be incorporated into the toner image-receiving layer of the present invention, if desired, those well-known as reinforcing agent, filler or reinforcing agent for the binder resins are usable. The fillers can be selected with reference to "*Binran Gomu-Plastic Haigo Yakuhin* (Handbook of Chemicals to be Incorporated into Rubbers and Plastics)" (edited by Rubber Digest Co.), "*Plastic Haigozai, Kiso to Oyo* (Additives to Plastics, Base and Application, New Edition) (published by Taisei K. K.) and "Filler Handbook" (published by Taisei K. K.).

The fillers usable herein include various inorganic fillers (or pigments). The inorganic pigments are, for example, silica, alumina, titanium dioxide, zinc oxide, zirconium oxide, mica-like iron oxide, white lead, lead oxide, cobalt oxide, strontium chromate, molybdenum pigments, smectites, magnesium oxide, calcium oxide, calcium carbonate and mullite. As the fillers, silica and alumina are particularly preferred. Two or more fillers can be used together.

As the fillers, those having a small particle diameter are preferred. When the a filler having a large particle diameter is used, the surface of the toner image-receiving layer is easily roughened.

The silica is divided into groups of spherical silica and amorphous silica. Silica can be synthesized by a dry method, wet method or aerogel method. The hydrophobic silica particles may be surface-treated with trimethylsilyl group or a silicone. The silica is preferably colloidal silica. The average particle diameter of the silica is 4 to 120 nm, preferably 4 to 90 nm.

The silica is preferably porous. The average pore diameter of the porous silica is preferably 50 to 500 nm. The average pore volume per mass of the porous silica is preferably, for example, 0.5 to 3 ml/g.

Alumina includes anhydrous alumina and alumina hydrate. Crystal types of anhydrous alumina usable herein are α, β, γ, δ, ζ, η, θ, κ, ρ and χ. Alumina hydrate is preferred to anhydrous alumina. The alumina hydrates usable herein are alumina monohydrate and trihydrates. Alumina monohydrates include pseudo-boehmite, boehmite and diaspore. Alumina trihydrates include gibbsite and bayerite. The average particle diameter of alumina is, for example, 4 to 300 nm, preferably 4 to 200 nm. Alumina is preferably porous. The average pore diameter of the porous alumina is preferably, for example, 50 to 500 nm. The average pore volume per mass of the porous alumina is preferably, for example, 0.3 to 3 ml/g.

Alumina hydrate can be synthesized by a sol/gel method wherein ammonia is added to an aluminum salt solution to precipitate it or by a method wherein an alkali aluminate is hydrolyzed. Anhydrous alumina can be obtained by dehydrating alumina hydrate by heating.

The amount of the filler is preferably 5 to 2,000% by mass based on the dry mass of the binder in a layer to which the filler is to be added.

A static charge controlling agent is preferably incorporated into the toner image-receiving layer of the present invention for controlling the toner transfer and adhesion and also for preventing the electrostatic adhesion of the toner image-receiving layer. The static charge controlling agents are those known in the art. They include surfactants such as cationic surfactants, anionic surfactants, amphoteric surfactants and nonionic surfactants, high-molecular electrolytes and conductive metal oxides.

The static charge controlling agents include cationic antistatic agents such as quaternary ammonium salts, polyamide derivatives, cation modified polymethyl methacrylate and cation modified polystyrene; anionic antistatic agents such as alkyl phosphates and anionic polymers; and non-ionic antistatic agents such as fatty acid esters and polyethylene oxides. However, the static charge controlling agents are not limited to them.

When the toner has a negative electric charge, the electric charge controlling agent to be incorporated into the toner image-receiving layer is preferably cationic or nonionic.

The conductive metal oxides are, for example, ZnO, $TiO_2$, $SnO_2$, $Al_2O_3$, $In_2O_3$, $SiO_2$, MgO, BaO and $MoO_3$. Those conductive metal oxides are usable either alone or in the form of a complex oxides of them. The metal oxides may further contain other elements. For example, ZnO can contain Al, In or the like, $TiO_2$ can contain Nb, Ta or the like, and $SnO_2$ can contain Sb, Nb, halogen elements or the like (doping).

The toner image-receiving layer used in the present invention preferably has a surface electric resistance in the range of $1\times10^6$ to $1\times10^{15}$ Ω (under conditions of 25° C., 65% RH). When it is below $1\times10^6$Ω, the amount of the toner is insufficient when the toner is transferred to the toner image-receiving layer, and the obtained toner image density is inclined to be low. On the contrary, when the surface electric resistance is above $1\times10^{15}$Ω, the electric charge is formed excessively in the transfer, the toner is not sufficiently transferred, the density of the image is low, dust easily adheres to the electrophotographic image-receiving sheet with static electricity while the sheet is handled, and misfeeding, double feeding, discharge mark and toner transfer error are caused unfavorably.

The optimum surface electric resistance of a transparent toner image-receiving layer is $10^{10}$ to $10^{13}$ Ω/cm², preferably $5\times10^{10}$ to $5\times10^{12}$ Ω/cm². The amount of the antistatic agent used is such that the surface electric resistance will be in this range. The surface electric resistance on the back surface of the base paper (opposite to the toner image-receiving layer) is $5\times10^8$ to $3.2\times10^{10}$ Ω/cm², preferably $1\times10^9$ to $1\times10^{10}$ Ω/cm².

The surface electric resistance is determined according to JIS K 6911. Namely, water content of a sample is controlled by keeping it in an atmosphere having a temperature of 20° C. and a humidity of 65% for at least 8 hours, and then applying an electric current to the sample under 100 V with R8340 (Advantest Corporation) under the same environmental conditions as above for 1 minute, and then the surface electric resistance is determined.

The toner image-receiving layer of the electrophotographic image-receiving sheet of the present invention may contain a fluorescent brightening agent, white pigment, coloring pigment, dye, etc. for improving the image quality, particularly degree of whiteness.

The fluorescent brightening agents are compounds having an absorption band in a near-ultraviolet zone and emit the fluorescence in the range of 400 to 500 nm. Well-known fluorescent brightening agents are usable without any limitation. Preferred fluorescent brightening agents are, for example, compounds described in The Chemistry of Synthetic Dyes (edited by K. Veen Rataraman), Volume V, Chapter 8. Concretely, they include stilbene compounds, coumarin compounds, biphenyl compounds, benzoxazoline compounds, naphthalimide compounds, pyrazoline compounds and carbostyryl compounds. Examples of them include White Falfar PSN, PHR, HCS, PCS and B (Sumitomo Chemical Co., Ltd.) and UVITEX-OB (Ciba-Geigy).

As the white pigments, the inorganic pigments (titanium oxide, calcium carbonate, etc.) described above with reference to the fillers are usable. The coloring pigments include various pigments described in, for example, J. P. KOKAI No. Sho 63-44653 and azo pigments (azo lakes such as Carmine 6B and Red 2B; insoluble azo pigments such as Monoazo Yellow, Disazo Yellow, Pyrazolo Orange and Vulcan Orange; and condensed azo pigments such as Chromophthal Yellow and Chromophthal Red), polycyclic pigments (phthalocyanine pigments such as Copper Phthalocyanine Blue and Copper Phthalocyanine Green; dioxazine pigments such as Dioxazine Violet; isoindolinone pigments such as Isoindolinone Yellow; threne pigments such as perylene, perinone, flavanthrone and thioindigo), lake pigments (Malachite Green, Rhodamine B, Rhodamine G and Victoria Blue B) and inorganic pigments such as oxides, titanium dioxide, red iron oxide, sulfates (precipitated barium sulfate), carbonates (precipitated calcium carbonate), silicates (hydrous silicates and anhydrous silicates) and metal powders (aluminum powder, bronze powder, zinc powder, carbon black, chrome yellow and Prussian blue).

As the dyes, various well-known dyes are usable. The oil-soluble dyes include anthraquinone compounds and azo compounds. Examples of the water-insoluble dyes include vat dyes such as C.I. Vat Violet 1, C.I. Vat Violet 2, C.I. Vat Violet 9, C.I. Vat Violet 13, C.I. Vat Violet 21, C.I. Vat Blue 1, C. I. Vat Blue 3, C.I. Vat Blue 4, C.I. Vat Blue 6, C. I. Vat Blue 14, C.I. Vat Blue 20 and C.I. Vat Blue 35; disperse dyes such as C.I. Disperse Violet 1, C.I. Disperse Violet 4, C.I. Disperse Violet 10, C.I. Disperse Blue 3, C.I. Disperse Blue 7 and C.I. Disperse Blue 58; and oil-soluble dyes such as C.I. Solvent Violet 13, C. I. Solvent Violet 14, C. I. Solvent Violet 21 and C.I. Solvent Violet 27, C.I. Solvent Blue 11, C.I. Solvent Blue 12, C.I. Solvent Blue 25 and C.I. Solvent Blue 55.

Colored couplers used for the silver salt photography are also preferably used.

The toner image-receiving layer of the electrophotographic image-receiving sheet of the present invention preferably has a high degree of whiteness. As for the degree of whiteness, L* value in CIE 1976 (L*a*b*) color space is at least 80, preferably at least 85 and more preferably at least 90. The tinge of the white color is desirably as neutral as possible. As for the tinge of the white color, the value of (a*)2+(b*)2 in L*a*b* space is preferably not higher than 50, more preferably not higher than 18 and most preferably not higher than 5.

The toner image-receiving layer of the present invention preferably has a high surface gloss. As for the surface gloss, 45° surface gloss in the whole zone ranging from white (no toner) to black (maximum toner concentration) is preferably not lower than 60, more preferably not lower than 75 and most preferably not lower than 90. However, the surface gloss is preferably not higher than 110. When it is higher than 110, the gloss is like a metallic gloss which is unsuitable for the image quality.

The surface gloss can be determined according to JIS Z 8741.

The smoothness of the toner image-receiving layer used in the present invention is preferably high. As for the degree of smoothness, the arithmetic mean roughness (Ra) in the whole zone ranging from white (no toner) to black (maximum toner density) is preferably not higher than 3 μm, more preferably not higher than 1 μm and most preferably not higher than 0.5 μm.

The arithmetic mean roughness can be determined according to JIS B 0601, B 0651 and B 0652.

The toner image-receiving layer used in the present invention may contain various antioxidants, agents for preventing aging, agents for preventing deterioration, agents for preventing deterioration caused by ozone, ultraviolet absorbers, light stabilizers, antiseptics and antifungal agents for improving the stability of the output image and also the stability of the image-receiving layer per se.

The antioxidants include, for example, chroman compounds, coumaran compounds, phenol compounds (such as hindered phenol), hydroquinone derivatives, hindered amine derivatives and spiroindane compounds. The antioxidants usable herein are those described in J. P. KOKAI Sho 61-159644.

The agents for preventing aging are, for example, those described on pages 76 to 121 of *Binran Gomu-Plastic Haigo Yakuhin* (Handbook of Chemicals to be Incorporated into Rubbers and Plastics)" (edited by Rubber Digest Co. in 1993).

The ultraviolet absorbers are, for example, benzotriazole compounds (U.S. Pat. No. 3,533,794), 4-thiazolidone compounds (U.S. Pat. No. 3,352,681), benzophenone compounds (J. P. KOKAI No. Sho 46-2784) and ultraviolet absorbing polymers (J. P. KOKAI No. Sho 62-260152).

The metal complexes are, for example, those described in U.S. Pat. Nos. 4,241,155, 4,245,018 and 4,254,195, and J. P. KOKAI Nos. Sho 61-88,256, Sho 62-174,741, Sho 63-199,248, Hei 1-75,568 and Hei 1-74,272.

Further, ultraviolet absorbers and photo stabilizers described on pages 122 to 137 of *Binran Gomu-Plastic Haigo Yakuhin* (Handbook of Chemicals to be Incorporated into Rubbers and Plastics)" (edited by Rubber Digest Co.) are also preferably used.

The toner image-receiving layer in the present invention can further contain known photographic additives. The photographic additives are described in Research Disclosure (hereinafter referred to as "RD") Nos. 17,643 (December, 1978), 18,716 (November, 1979) and 307,105 (November, 1989). The corresponding positions in RD are summarized in the following table.

| Additive | RD 17643 | RD 18, 716 | RD 307, 105 |
|---|---|---|---|
| Whitening agent | p. 24 | p. 648, right column | p. 868 |
| Stabilizer | pp. 24–25 | p. 649, right column | pp. 868–870 |
| Light absorber UV absorber | pp. 25–26 | p. 649, right column | p. 873 |
| Dye image stabilizer | p. 25 | p. 650, right column | p. 872 |
| Hardening agent | p. 26 | p. 651, left column | pp. 874–875 |
| Binder | p. 26 | p. 651, left column | pp. 873–874 |
| Plasticizer, lubricant | p. 27 | p. 650, right column | p. 876 |
| Coating aid Surfactant | pp. 26–27 | p. 650, right column | pp. 875–876 |
| Antistatic agent | p. 27 | p. 650, right column | pp. 876–877 |

Protecting Layer

A protecting layer can be provided on the surface of the toner image-receiving layer of the electrophotographic image-receiving sheet of the present invention for the purposes of protecting the surface, improving the storability and handleability, imparting possibility of autography, improving passability through machines and imparting anti-offset property. The protecting layer may be composed of one layer or two or more layers. The protecting layer may contain various thermoplastic resins and thermosetting resins as binders. The resin is preferably the same as that used in the toner image-receiving layer. However, the thermodynamic properties and electrostatic properties of the protecting layer are not necessarily the same as those of the toner image-receiving layer, and the respective layers can have optimum properties.

The protecting layer can contain the above-described various additives usable for the toner image-receiving layer. In particular, the protecting layer can contain, for example, plasticizers, releasing agents and slip agents.

The outmost surface layer (for example, the surface-protecting layer when it is provided) of the electrophotographic image-receiving sheet of the present invention preferably has a high compatibility with the toner from the viewpoint of the fixing property. Concretely, the angle of contact with the molten toner is preferably, for example, 0 to 40°.

Back Layer

The electrophotographic image-receiving sheet of the present invention can have a back layer on the surface on the side opposite to the toner image-receiving layer for the purposes of providing output ability at the backside of the base paper, improving the backside image output quality, improving the curl balance and improving the sheet passing ability through the machines.

The composition of the back layer of the electrophotographic image-receiving sheet may be the same as that of the toner image-receiving layer for the purpose of improving the both sides output ability. The back layer can contain various additives described above with reference to the toner image-receiving layer. An electrification controlling agent is suitable as the additive. The back layer may comprise either one layer or two or more layers.

The back layer may be an oil-absorbing layer when a releasing oil is used for a fixing roller or the like for preventing offset in the fixing step.

Other Optional Layers

The electrophotographic image-receiving sheet of the present invention may have a contact improving layer for improving the contact between the polyolefin or polypropylene resin layer and the toner image-receiving layer. The contact improving layer can contain various additives described above, particularly the crosslinking agent. The electrophotographic image-receiving sheet of the present invention may have a cushion layer between the contact improving layer and the toner image-receiving layer for improving the toner acceptability.

The electrophotographic image-receiving sheet of the present invention can have an intermediate layer in addition to the above-described various layers. The intermediate layer can be formed, for example, between the polyolefin or polypropylene resin layer and the contact improving layer, between the contact improving layer and the cushion layer, between the cushion layer and the toner image-receiving layer or between the toner image-receiving layer and the storability improving layer. In an electrophotographic image-receiving sheet comprising the base paper, the polyolefin resin layer, the toner image-receiving layer and the intermediate layer, the intermediate layer can be formed between the polyolefin resin layer and the toner image-receiving layer as a matter of course.

Toner for Color Electrophotography

The electrophotographic image-receiving sheet of the present invention is used in combination with a toner or toner particles in the printing or copying. The toner used in the present invention can be obtained by a pulverization method or a suspension granulation method.

In the pulverization method, the toner is obtained by kneading, pulverization and classification. Binding resins usable for the production of the toner by the pulverization include, for example, acids such as acrylic acid, methacrylic acid and maleic acid and esters thereof; polyesters; polysulfonates; polyethers; and resins, obtained by polymerizing monomers, such as polyurethanes, and resins obtained by copolymerizing two or more of the monomers. These resins are thoroughly kneaded with other materials for constituting the toner by means of a hot kneader such as a hot roll, kneader or extruder and then mechanically pulverized and classified.

The toner thus obtained preferably contains 0.1 to 10% by mass, particularly 0.5 to 7% by mass, based on the toner, of a wax component.

In the suspension granulation method, the toner is obtained by mixing a binder, a colorant and a releasing agent (and, if necessary, a magnetic substance, an antistatic agent and other additives) in a solvent having no affinity for water, the resultant composition is covered with a polymer having carboxyl group, dispersing the resultant product in an aqueous medium in the presence of a hydrophilic inorganic dispersing agent having a BET specific surface area of 10 to 50 $m^2/g$ and/or a viscosity regulator, diluting, if necessary, the resultant suspension with an aqueous medium and removing the solvent by heating the resultant suspension and/or reducing the pressure. In the present invention, the toner produced by the suspension granulation method is preferably used. In some cases, the results obtained by using the toner obtained by the suspension granulation method are superior to those obtained by using the toner obtained by the pulverization method.

The binder used for obtaining toners by the suspension granulation method is any of known binder resins. Concretely, those resins are homopolymers and copolymers such as styrenes, e.g., styrene and chlorostyrene; monoolefins, e.g., ethylene, propylene, butylene and isoprene; vinyl esters, e.g., vinyl acetate, vinyl propionate, vinyl benzoate and vinyl butyrate; a -methylene aliphatic monocarboxylic acid esters, e.g., methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate; vinyl ethers, e.g., vinyl methyl ether, vinyl ethyl ether and vinyl butyl ether; and vinyl ketones, e.g., vinyl methyl ketone, vinyl hexyl ketone and vinyl isopropenyl ketone. Particularly typical binder resins include polystyrene resin, polyester resin, styrene/alkyl acrylate copolymers, styrene/alkyl methacrylate copolymers, styrene/acrylonitrile copolymer, styrene/butadiene copolymer, styrene/maleic anhydride copolymer, polyethylene resin and polypropylene resin. They further include polyurethane resin, epoxy resin, silicone resin, polyamide resin, modified rosin, paraffins and waxes. In those resins, a styrene/acrylic resin is preferred in the present invention.

The colorants to be incorporated into the toner binder are well-known colorants without any limitation. The typical examples of the colorants are carbon black, Aniline Blue, Calcoil Blue, Chrome Yellow, Ultramarine Blue, Du Pont Oil Red, Quinoline Yellow, Methylene Blue Chloride, Phthalocyanine Blue, Malachite Green Oxalate, Lamp Black, Rose Bengal, C.I. Pigment Red 48:1, C.I. Pigment Red 122, C.I. Pigment Red 57:1, C.I. Pigment Yellow 97, C.I. Pigment Yellow 12, C.I. Pigment Yellow 17, C.I. Pigment Blue 15:1 and C.I. Pigment Blue 15:3.

The colorant content is, for example, 2 to 8% by mass and preferably 4 to 6% by mass. When the colorant content is less than 2% by mass, the coloring power is easily weakened and, on the contrary, when it is more than 8% by mass, the transparency of the color toner is easily reduced.

The toner preferably contains a releasing agent. The releasing agents preferably used herein are, for example, waxes. Concretely, the releasing agents usable herein are low-molecular weight polyolefins such as polyethylene, polypropylene and polybutene; silicone resins which can be softened by heating, fatty acid amides such as oleamide, erucamide, ricinoleamide and stearamide; vegetable waxes such as carnauba wax, rice wax, candelilla wax, Japan wax and jojoba oil; animal waxes such as bees wax; mineral and petroleum waxes such as montan wax, ozocerite, ceresine, paraffin wax, microcrystalline wax and Fischer-Tropsch wax; and modified products of them. When a wax containing a wax ester having a high polarity, such as carnauba wax or candelilla wax, is used as the releasing agent, the amount of the wax exposed to the toner particle surface is inclined to be large. On the contrary, when a wax having a low polarity such as polyethylene wax or paraffin wax is used, the amount of the wax exposed to the toner particle surface is inclined to be small.

Irrespective of the inclination of the exposure to the surface, waxes having a melting point in the range of 30 to 150° C. are preferred and those having a melting point in the range of 40 to 140° C. are more preferred.

The toner used in the present invention is mainly composed of the above-described coloring agent and binder. The average particle diameter of the toner is, for example, 3 to 15 $\mu$m, preferably 4 to 8 $\mu$m. The storage elastic modulus G' of the toner per se (determined at an angular frequency of 10 rad/sec) at 150° C. is preferably in the range of 10 to 200 Pa.

The toner used in the present invention may contain an additive. Fine powders of inorganic and organic compounds are used as the additive. Fine particles of the inorganic compounds are those of, for example, $SiO_2$, $TiO_2$, $Al_2O_3$, CuO, ZnO, $SnO_2$, $Fe_2O_3$, MgO, BaO, CaO, $K_2O$, $Na_2O$, $ZrO_2$, CaO. $SiO_2$, $K_2O$. $(TiO_2)_n$, $Al_2O_3$. 2 $SiO_2$, $CaCO_3$, $MgCO_3$, $BaSO_4$ and $MgSO_4$. The fine particles of organic compounds are those of fatty acids and derivatives thereof and metal salts thereof, and also those of resins such as fluororesins, polyethylene resins and acrylic resins.

Image-Forming Apparatus and Method

The method for forming an image on the electrophotographic image-receiving sheet of the present invention is not particularly limited. Various electrophotographic methods can be employed.

For example, a color image can be suitably formed on the electrophotographic image-receiving sheet of the present invention. A color image can be formed with an electrophotographic apparatus capable of forming a full-colored image. An ordinary electrophotographic apparatus is composed of an image-receiving sheet sending part, a latent image-forming part and a developing part placed close to the latent image-forming part. In some apparatus, an intermediate toner image-transfer part is placed close to the latent image-forming part and the image-receiving sheet sending part at a center of the apparatus.

For improving the image quality, an adhesion transfer method or a heat-support papering transfer method to be conducted in place of or in combination with the electrostatic transfer or bias roller transfer method is known. The structures of the transfer apparatus is described in, for example, J. P. KOKAI Nos. Sho 63-113,576 and Hei 5-341,666. The heat-supporting transfer method wherein an intermediate transfer belt is used is preferred particularly when a toner having a small particle diameter (not larger than 7 $\mu$m) is used. The intermediate belt is, for example, an endless belt made of electroformed nickel. This belt has a thin silicone or fluorine film on the surface thereof so as to have a releasing property. Preferably, the intermediate belt used after the toner transfer to the electrophotographic image-receiving sheet or in the latter half of the stage of the transfer is provided with a cooling device. With the cooling device, the toner is cooled to a temperature lower than the softening point of the binder or lower than the glass transition temperature thereof, then efficiently transferred to the electrophotographic image-receiving sheet to make the release thereof from the intermediate belt possible.

The fixing is an important step for the gloss and smoothness of the final image. For the fixing, a method wherein a heating pressure roller is used and another method wherein a belt is used are known. From the viewpoints of the image qualities such as gloss and smoothness, the belt fixing method is preferred. As for this method, a method described in J. P. KOKAI No. Hei 11-352,819 wherein an oilless type belt is used and also a method described in J.P. KOKAI Nos. Hei 11-231,671 and Hei 5-341,666 wherein the secondary transfer and the fixing are performed at the same time are known.

The surface of the fixing belt is preferably treated with a surface-treating agent containing silicon, fluorine or a combination of them for preventing the peeling of the toner or the offset of the toner component. In the latter half of the fixing step, a cooling apparatus for the belt is preferably provided to facilitate the release of the electrophotographic image-receiving sheet. The cooling temperature is preferably lower than the softening point or glass transition point of the toner binder and/or the polymer in the toner image-receiving layer of the electrophotographic image-receiving sheet. On the other hand, in the initial stage of the fixing, the temperature must be elevated to a point at which the toner image-receiving layer of the electrophotographic image-receiving sheet or the toner is sufficiently softened. Concretely, the cooling temperature is practically preferably 30 to 70° C., and the temperature in the initial stage of the fixing is 100 to 180° C.

The following Examples and Comparative Examples will further illustrate the present invention, which by no means limit the invention.

In the following Examples and Comparative Examples, percentages and parts are given by mass.

EXAMPLE 1A

A layer of a polypropylene resin having a thickness of 30 $\mu$m was formed on both surfaces of a raw paper having a basis weight of 160 g/m$^2$ by the melt extrusion with a single-screw extruder (a screw extruder having a diameter of 60 mm) under the following lamination conditions. The polypropylene resin in the polypropylene resin layer had an MFR of 40 g/10 min and a density of 0.900 g/cm$^3$.

line velocity: 100 m/min
corona output: 0.05 kw/m$^2$·min
extrusion temperature: 305° C.
nip pressure: 40 kg/cm$^2$
chill-roll temperature: 15° C.
chill-roll surfaces: mirror surface and back mat surface The polypropylene resin layers thus formed on both surfaces of the resultant laminate were treated by corona discharge. Then, a composition for forming a subbing layer was applied to the surface thereof with a wire coater so that the weight of the coating after drying would be about 0.1 g/m$^2$ and then dried.

| <Composition for forming subbing layer> | |
|---|---|
| gelatin | 5 g |
| water | 1000 g |

Then, the following composition for forming the toner image-receiving layer was applied to the surface of the surface-polypropylene resin layer in such an amount that the dry film weight would be 8 g/m$^2$ with a wire coater and then dried to form a toner image-receiving layer.

| <Composition for forming toner image-receiving layer> | |
|---|---|
| Polyester resin (Tafton U-5, Kao Corporation) | 400 g |
| Titanium dioxide [Typaque (registered trade name) A-220, Isihara Sangyo Kaisha, Ltd.) | 60 g |
| TPP (Daihachi Kagaku) | 34.8 g |
| Methyl ethyl ketone | 800 g |

Note)
TPP represents triphenyl phosphate used as the plasticizer.

Then, the following composition for forming the protecting layer was applied to the surface of the toner image-receiving layer in such an amount that the dry mass weight would be 0.8 g/m$^2$, and then dried to form a protecting layer.

| <Protecting layer> | |
|---|---|
| A515GB (Takamatsu Yushi) | 1790 g |
| LX814 (Nippon Zeon Co., Ltd.) | 491 g |

-continued

| <Protecting layer> | |
|---|---|
| Water | 8900 g |
| SH7028A (Toray Silicone Dow Corning) | 740 g |

Notes)
A515GB is a water-dispersible polyester resin.
LX814 is a water-dispersible acrylic resin used as the binder.
SH7028A is a silicone rubber having a siloxane structure and used as the slip agent or releasing agent.

Then, the following composition for forming the back layer was applied to the linear low-density polyethylene resin layer (back side) in such an amount that the dry film mass would be 4.5 g/$m^2$ with a bar coater and then dried to form a back layer.

| <Composition for forming back layer> | |
|---|---|
| Polyester resin (Vironal MD-1200, Toyobo Co., Ltd.) | 90 g |
| Matting agent (Epostar L15, Nippon Shokubai Kagaku Kogyo Co., Ltd.) | 50 g |
| Water | 10000 g |

Note)
Epostar L15 used as the matting agent is polymer particles comprising a benzoguanamine/formaldehyde condensate having an average diameter of 12 μm, which has no melting point or grass transition temperature and which starts to be decomposed at 300° C. in the differential thermal analysis.

The electrophotographic image-receiving sheet thus obtained was cut into a size of A4. An image to be printed was formed thereon. The printer used was the same as a color laser printer (DocuColor 1250 PF) (Fuji Xerox Co., Ltd.) except that a fixing belt system shown in FIG. 1 was used.

Namely, in a fixing belt system 1 shown in FIG. 1, a fixing belt 2 is set over a heating roller 3 and a tension roller 5. A cleaning roller 6 is provided over the tension roller 5 via the fixing belt 2. A pressure roller 4 is provided below the heating roller 3 via the fixing belt 2. An electrophotographic image-receiving sheet having a toner latent image is inserted between the heating roller 3 and the pressure roller 4 on the right side in FIG. 1, fixed and then moved on the fixing belt 2. The fixing belt 2 is cleaned with a cleaning roller G.

In this fixing belt system, the transfer speed of the fixing belt 2 is 30 mm/sec; the nip pressure between the heating roller 3 and the pressure roller 4 is 0.2 MPa (2 kgf/$cm^2$); and the setting temperature of the heating roller 3 is 150° C., which corresponds to the fixing temperature. The setting temperature of the pressure roller 4 is 120° C.

Evaluation Method

A monochromatic black image in a computer was printed. The foaming on the toner fixing surfaces of the printed samples and the staining of the fixing roll were determined by organoleptic tests. The test results were shown by ○, Δ and X which indicate that the results were good, fair and bad, respectively. The overall evaluation results were shown by ○, Δ and x which indicate that the results were good, impractical and bad, respectively.

Comparative Examples 1a to 4a

The procedure of Example 1A was repeated except that the polypropylene resin used as the starting material for the polypropylene resin layer was replaced with polyethylene resin or that MFR and density of the polypropylene resin material used were altered. The results of Example 1A and Comparative Examples 1a to 4a are shown in the following Table 1.

TABLE 1

| | Properties of resin | | | Properties of print | | |
|---|---|---|---|---|---|---|
| | Resin | MFR | Density | Foaming property in the fixing | Stain of fixing roll | Overall evaluation |
| Ex. 1A | A | 40 | 0.900 | ○ | ○ | ○ |
| Comp. Ex. 1a | B | 20 | 0.920 | X | X | X |
| Comp. Ex. 2a | A | 15 | 0.900 | Δ | ○ | Δ |
| Comp. Ex. 3a | A | 55 | 0.890 | ○ | Δ | Δ |
| Comp. Ex. 4a | A | 40 | 0.870 | ○ | Δ | Δ |

(A: polypropylene resin, B: polyethylene resin)

It is apparent from the results given above that an electrophotographic image-receiving paper having an image excellent in the gloss and quality can be obtained by forming a layer of a polypropylene resin material having specified MFR and density, in direct contact with both surfaces of a base paper. As shown in Comparative Example la wherein polyethylene resin is used, blisters are formed between the base paper and the resin layer to seriously lower the gloss and image quality when the fixing temperature is high. It is apparent from the results obtained in Comparative Examples 2a to 4a that when a polypropylene resin having an MFR and a density which are not within the predetermined ranges is used, the electrophotographic image-receiving paper having excellent gloss and image quality cannot be obtained.

According to the present invention, an image having excellent gloss and quality can be provided by the simple method.

EXAMPLE 1B

A layer of a polypropylene resin having a thickness of 15 μm was formed on both surfaces of a raw paper having a basis weight of 160 g/$m^2$ by the melt extrusion with a single-screw extruder (a screw extruder having a diameter of 60 mm) under the following lamination conditions. The polypropylene resin in the polypropylene resin layer had an MFR of 35 g/10 min, density of 0.900 g/$cm^3$ and melting point (mp) of 161° C.

line velocity: 100 m/min
corona output: 0.07 kw/$m^2$·min
extrusion temperature: 305° C.
nip pressure: 40 kg/$cm^2$
chill-roll temperature: 15° C.
chill-roll surfaces: mirror surface and back mat surface The polypropylene resin layer thus formed on the surface of the resultant laminate was treated by corona discharge. Then, a composition for forming a subbing layer was applied to the surface thereof with a wire coater so that the weight of the coating after drying would be about 0.2 g/$m^2$ and then dried.

| <Composition for forming subbing layer> | |
|---|---|
| gelatin | 20 g |
| water | 500 g |
| methanol | 500 ml |

Then, the following composition for forming the toner image-receiving layer was applied to the surface of the surface-polypropylene resin layer in such an amount that the dry film weight would be 8 g/$m^2$ with a wire coater and then dried to form a toner image-receiving layer.

| <Composition for forming toner image-receiving layer> | |
|---|---|
| Polyester resin (Tafton U-5, Kao Corporation) | 400 g |
| Titanium dioxide [Typaque (registered trade name) A-220, Isihara Sangyo Kaisha, Ltd.) | 60 g |
| TPP (Daihachi Kagaku) | 35 g |
| Methyl ethyl ketone | 800 g |

Note)
TPP represents triphenyl phosphate used as the plasticizer.

Then, the following composition for forming the protecting layer was applied to the surface of the toner image-receiving layer in such an amount that the dry coating weight would be 0.8 g/$m^2$, and then dried to form a protecting layer.

| <Protecting layer> | |
|---|---|
| A515GB (Takamatsu Yushi) | 1790 g |
| LX814 (Nippon Zeon Co., Ltd.) | 491 g |
| Water | 8900 g |
| SH7028A (Toray Silicone Dow Corning) | 740 g |

Notes)
A515GB is a water-dispersible polyester resin.
LX814 is a water-dispersible acrylic resin used as the binder.
SH7028A is a silicone rubber having a siloxane structure and used as the slip agent or releasing agent.

Then, the following composition for forming the back layer was applied to the polypropylene resin layer (back side) in such an amount that the dry film coating would be 4.5 g/$m^2$ with a bar coater and then dried to form a back layer.

| <Composition for forming back layer> | |
|---|---|
| Polyester resin (Vironal MD-1200, Toyobo Co., Ltd.) | 90 g |
| Matting agent (Epostar L15, Nippon Shokubai Kagaku Kogyo Co., Ltd.) | 50 g |
| Water | 10000 g |

Note)
Epostar L15 used as the matting agent is polymer particles comprising a benzoguanamine/formaldehyde condensate having an average diameter of 12 $\mu$m, which has no melting point or glass transition temperature and which starts to be decomposed at 300° C. in the differential thermal analysis.

The electrophotographic image-receiving sheet thus obtained was cut into a size of A4. An image to be printed was formed thereon. The printer used was the same as a color laser printer (DocuColor 1250 PF) (Fuji Xerox Co., Ltd.) except that a fixing belt system shown in FIG. 1 was used.

Namely, as stated above, in a fixing belt system 1 shown in FIG. 1, a fixing belt 2 is set over a heating roller 3 and a tension roller 5. A cleaning roller 6 is provided over the tension roller 5 via the fixing belt 2. A pressure roller 4 is provided below the heating roller 3 via the fixing belt 2. An electrophotographic image-receiving sheet having a toner latent image is inserted between the heating roller 3 and the pressure roller 4 on the right side in FIG. 1, fixed and then moved on the fixing belt 2. The fixing belt 2 is cleaned with a cleaning roller 6.

In this fixing belt system, the transfer speed of the fixing belt 2 is 30 mm/sec; the nip pressure between the heating roller 3 and the pressure roller 4 is 0.2 MPa (2 kgf/$cm^2$); and the setting temperature of the heating roller 3 is 160° C., which corresponds to the fixing temperature. The setting temperature of the pressure roller 4 is 130° C.

Evaluation Method

Blister Formation

After the printing, the electrophotographic image-receiving sheets were macroscopically observed to count the number of blisters (pores in the PP or PE layer) larger than 1 mm (per 100 sheets of A4 size).

Standard of Evaluation

A: none
B: 1 or 2
C: 3 to 10
D: 11 or more

Peeling Property of Toner Image-Receiving Layer

After the printing, the electrophotographic image-receiving sheets were macroscopically observed. The number of portions of peeling of at least 1 mm (peeling of the toner image-receiving layer) was counted (per 100 sheets of A4 size).

Standard of Evaluation

A: none
B: 1 or 2
C: 3 to 10
D: 11 or more

Image Quality

Electrophotographic image-receiving sheets were cut into pieces of a size of A4. A lady portrait image on the sheet was judged by 30 people. When at least 25 people judged it to be photographically excellent, the results were shown as ○; when at least 20 people judged it to be excellent, the results were shown as Δ; and when less than 20 people judged it to be so, the results were X.

Surface Gloss

After the printing, the surface gloss of the electrophotographic image-receiving sheets was macroscopically observed. The surface gloss was ranked as A, B, C and D, A being the most excellent.

Standard of Evaluation

A: usable (excellent)
B: usable (tolerable)
C: unusable (practically unusable)
D: unusable

EXAMPLES 2B to 5B AND COMPARATIVE EXAMPLES 1b to 4b

Electrophotographic image-receiving sheets were prepared in the same manner as that of Example 1B except that the resin layers, formed on both surfaces of the base paper, and the surface tension were altered. They were evaluated in the same manner as that of Example 1B. The results are shown in following Table 2.

TABLE 2

| | Material of resin layer | Electric power in corona discharge treatment kw/m$^2$/min | Surface tension dyne/cm | Subbing layer |
|---|---|---|---|---|
| Ex. 1B | PP | 0.07 | 48 | no |
| Ex. 2B | PP | 0.07 | 48 | yes |
| Ex. 3B | PP | 0.10 | 50 | yes |
| Ex. 4B | PP | 0.10 | 52 | no |
| Ex. 5B | PP | 0.10 | 52 | yes |
| Comp. Ex. 1b | LDPE/LLDPE = 7/3 | 0.04 | 50 | yes |
| Comp. Ex. 2b | HDPE/LDPE = 7/3 | 0.04 | 50 | yes |
| Comp. Ex. 3b | PP | 0.04 | 44 | no |
| Comp. Ex. 4b | PP | 0.04 | 44 | yes |

| | Evaluation of properties | | | |
|---|---|---|---|---|
| | Blister formation | Peeling | Image quality | Surface gloss |
| Ex. 1 | A | B | A | A |
| Ex. 2 | A | A | A | A |
| Ex. 3 | A | A | A | A |
| Ex. 4 | A | A | A | A |
| Ex. 5 | A | A | A | A |
| Comp. Ex. 1 | D | A | Evaluation impossible | Evaluation impossible |
| Comp. Ex. 2 | D | A | Evaluation impossible | Evaluation impossible |
| Comp. Ex. 3 | A | D | Evaluation impossible | Evaluation impossible |
| Comp. Ex. 4 | A | D | Evaluation impossible | Evaluation impossible |

The resin materials other than PP (polypropylene resin) used herein were as follows:
LDPE: low-density polyethylene (MFR: 6 g/10 min, density: 0.921 g/cm$^3$, mp.: 102° C.)
HDPE: high-density polyethylene (MFR: 17 g/10 min, density: 0.950 g/cm$^3$, mp.: 131° C.)
LLDPE: linear low-density polyethylene (MFR: 10 g/10 min, density: 0.935 g/cm$^3$, mp: 125° C.)

It is apparent from the results shown above that by forming the polypropylene resin layer on both surfaces of the base paper and controlling the surface tension of the polypropylene resin layer on the toner image-receiving layer side at 48 dyne/cm or higher, no blister is formed and the toner image-receiving layer formed thereon is not easily peeled off even in the fixing at a high fixing temperature, and the resultant image has a high image quality and gloss. On the other hand, in Comparative Examples 3b and 4b wherein the polypropylene resin layer is formed but the surface tension is below 48 dyne/cm, the toner image-receiving layer is easily peeled and the image quality and gloss are practically valueless. In Comparative Examples 1b and 2b wherein the polyethylene resin layer is used, blisters are formed and the image quality and gloss are practically valueless even though the surface tension is above 48 dyne/cm.

According to the present invention, an electrophotographic image-receiving sheet excellent in preventing the peeling of the toner image-receiving layer and also in the quality and surface gloss can be obtained even by the fixing at a high temperature.

EXAMPLE 1C

A layer of a linear low-density polyethylene resin (LLDPE) having a thickness of 0.039 mm was formed on both surfaces of a raw paper having a basis weight of 160 g/m$^2$ by the melt extrusion with a single-screw extruder (a screw extruder having a diameter of 60 mm) under the following lamination conditions. The linear low-density polyethylene resin had an MFR of 35 g/10 min, density of 0.900 g/cm$^3$ and melting point (mp) of 125° C.

line velocity: 100 m/min
corona output: 0.07 kw/m$^2$·min
extrusion temperature: 305° C.
nip pressure: 40 kg/cm$^2$
chill-roll temperature: 15° C.
chill-roll surfaces: mirror surface and back mat surface The linear, low-density polyethylene resin layer thus formed on the surface (the toner image-receiving layer side) of the resultant laminate was treated by corona discharge. Then, a composition for forming a subbing layer was applied to the surface thereof with a wire coater so that the weight of the coating after drying would be about 0.2 g/m$^2$ and then dried.

| <Composition for forming subbing layer> | |
|---|---|
| gelatin | 20 g |
| water | 500 g |
| methanol | 500 ml |

Then, the following composition for forming the toner image-receiving layer was applied to the surface of the linear low-density polyethylene resin layer in such an amount that the dry film weight would be 8 g/m$^2$ with a wire coater and then dried to form a toner image-receiving layer.

| <Composition for forming toner image-receiving layer> | |
|---|---|
| Polyester resin (Tafton U-5, Kao Corporation) | 400 g |
| Titanium dioxide [Typaque (registered trade name) A-220, Isihara Sangyo Kaisha, Ltd.) | 60 g |
| TPP (Daihachi Kagaku) | 35 g |
| Methyl ethyl ketone | 800 g |

Note)
TPP represents triphenyl phosphate used as the plasticizer.

Then, the following composition for forming the protecting layer was applied to the surface of the toner image-receiving layer in such an amount that the dry mass weight would be 0.8 g/m$^2$, and then dried to form a protecting layer.

| <Protecting layer> | |
|---|---|
| A515GB (Takamatsu Yushi) | 1790 g |
| LX814 (Nippon Zeon Co., Ltd.) | 491 g |
| Water | 8900 g |
| SH7028A (Toray Silicone Dow Corning) | 740 g |

Notes)
A515GB is a water-dispersible polyester resin.
LX814 is a water-dispersible acrylic resin used as the binder.
SH7028A is a silicone rubber having a siloxane structure and used as the slip agent or releasing agent.

Then, the following composition for forming the back layer was applied to the linear low-density polyethylene resin layer (back side) in such an amount that the dry film mass would be 4.5 g/m$^2$ with a bar coater and then dried to form a back layer.

| <Composition for forming back layer> | |
|---|---|
| Polyester resin (Vironal MD-1200, Toyobo Co., Ltd.) | 90 g |
| Matting agent (Epostar L15, Nippon Shokubai Kagaku Kogyo Co., Ltd.) | 50 g |
| Water | 10000 g |

Note)
Epostar L15 used as the matting agent is polymer particles comprising a benzoguanamine/formaldehyde condensate having an average diameter of 12 μm, which has no melting point or grass transition temperature and which starts to be decomposed at 300° C. in the differential thermal analysis.

The electrophotographic image-receiving sheet thus obtained was cut into a size of A4. An image to be printed was formed thereon. The printer used was the same as an electrophotographic printer DocuColor 1250 PF (Fuji Xerox Co., Ltd.) except that a fixing belt system shown in FIG. 2 was used. After the black printing on the whole toner image-receiving surface, the image was fixed with a belt fixing device shown in FIG. 2 while the printed surface was kept upward.

Figure 2:
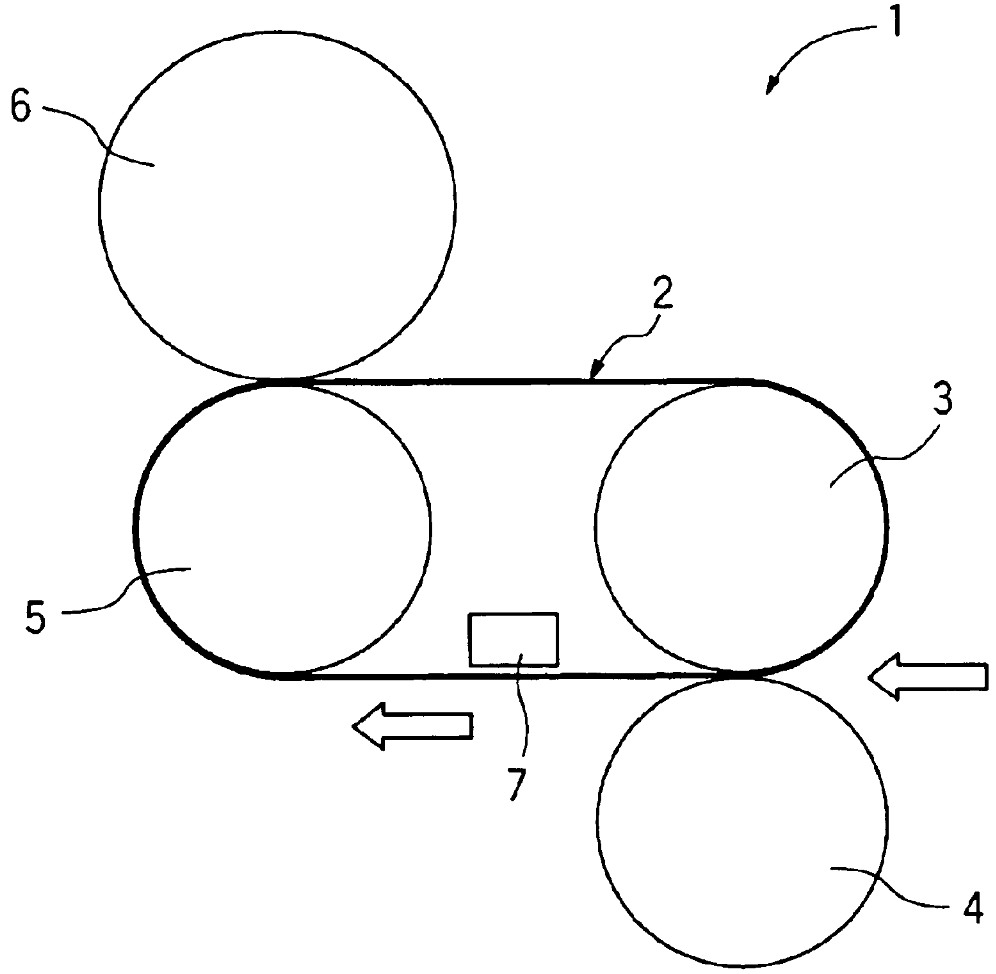
FIG. 2 is another schematic diagram showing a fixing belt system in a printer used in Examples.

Namely, in a fixing belt system 1 shown in FIG. 2, a fixing belt 2 is set over a heating roller 3 and a tension roller 5. A cleaning roller 6 is provided over the tension roller 5 via the fixing belt 2. A pressure roller 4 is provided below the heating roller 3 via the fixing belt 2. An electrophotographic image-receiving sheet having a toner latent image is inserted between the heating roller 3 and the pressure roller 4 on the right side in FIG. 1, pressed and heated and then moved with the fixing belt 2. The sheet is then cooled with a cooling device 7 provided downstream with the fixing belt 2. Thereafter, the electrophotographic image-receiving sheet is peeled from the fixing belt 2. The fixing belt 2 is cleaned with a cleaning roller 6 placed after the tension roller 5.

In this fixing belt system, the transfer speed of the fixing belt 2 is 30 mm/sec; the nip pressure between the heating roller 3 and the pressure roller 4 is 0.2 MPa (2 $kgf/cm^2$); and the setting temperature of the heating roller 3 is 160° C., which corresponds to the fixing temperature. The setting temperature of the pressure roller 4 is 130° C.

Evaluation Method

Blister Formation

After the printing, the electrophotographic image-receiving sheets were macroscopically observed to count the number of blisters (pores in the polyolefin resin layer) larger than 1 mm (per 100 sheets of A4 size).

Standard of Evaluation

A: none
B: 1 or 2
C: 3 to 10
D: 11 or more

Image Quality

Electrophotographic image-receiving sheets were cut into pieces of a size of A4. A lady portrait image on the sheet was judged by 30 people. When at least 25 people judged it to be photographically excellent, the results were shown as ○; when at least 20 people judged it to be excellent, the results were shown as Δ; and when less than 20 people judged it to be so, the results were X.

Surface Gloss

After the printing, the surface gloss of the electrophotographic image-receiving sheets was macroscopically observed. The surface gloss was ranked as A, B, C and D, A being the most excellent.

Standard of Evaluation

A: usable (excellent)
B: usable (tolerable)
C: unusable (practically unusable)
D: unusable

EXAMPLES 2C to 7C AND COMPARATIVE EXAMPLES 1c to 8c

Electrophotographic image-receiving sheets were prepared in the same manner as that of Example 1C except that the thickness of the polyolefin resin layers on the both surfaces of the base paper, and the material and melting point of the polyolefin resin were altered. They were evaluated in the same manner as that of Example 1C. The results are shown in following Table 3.

TABLE 3

| | Resin | Melting point (° C.) | (mp-50) | $(mp-50)^2$ | Thickness T(mm) | $(mp-50)^2 \times T$ |
|---|---|---|---|---|---|---|
| Ex. 1 | LLDPE | 125 | 75 | 5626 | 0.039 | 219 |
| Ex. 2 | HDPE | 131 | 81 | 6561 | 0.035 | 235 |
| Ex. 3 | HDPE | 131 | 81 | 6561 | 0.042 | 269 |
| Ex. 4 | PP | 147 | 97 | 9409 | 0.032 | 301 |
| Ex. 5 | PP | 147 | 97 | 9409 | 0.024 | 225 |
| Ex. 6 | PP | 160 | 110 | 12100 | 0.024 | 290 |
| Ex. 7 | PP | 160 | 110 | 12100 | 0.018 | 218 |
| Comp. Ex. 1 | LDPE | 99 | 49 | 2401 | 0.050 | 122 |
| Comp. Ex. 2 | LDPE | 99 | 49 | 2401 | 0.089 | 214 |
| Comp. Ex. 3 | LLDPE | 125 | 75 | 5625 | 0.030 | 169 |
| Comp. Ex. 4 | LLDPE | 125 | 75 | 5625 | 0.072 | 393 |
| Comp. Ex. 5 | HDPE | 131 | 81 | 6561 | 0.025 | 164 |
| Comp. Ex. 6 | HDPE | 131 | 81 | 6561 | 0.030 | 197 |
| Comp. Ex. 7 | PP | 147 | 97 | 9409 | 0.018 | 169 |
| Comp. Ex. 8 | PP | 160 | 110 | 12100 | 0.013 | 157 |

TABLE 3-continued

| | Degree of blisters | Image quality | Surface gloss |
|---|---|---|---|
| Ex. 1C | B | B | B |
| Ex. 2C | B | A | A |
| Ex. 3C | A | B | B |
| Ex. 4C | A | A | A |
| Ex. 5C | B | A | A |
| Ex. 6C | A | A | A |
| Ex. 7C | B | A | A |
| Comp. Ex. 1c | D | Evaluation impossible | Evaluation impossible |
| Comp. Ex. 2c | B | D | C |
| Comp. Ex. 3c | D | Evaluation impossible | Evaluation impossible |
| Comp. Ex. 4c | A | C | C |
| Comp. Ex. 5c | D | Evaluation impossible | Evaluation impossible |
| Comp. Ex. 6c | C | Evaluation impossible | Evaluation impossible |
| Comp. Ex. 7c | D | Evaluation impossible | Evaluation impossible |
| Comp. Ex. 8c | D | Evaluation impossible | Evaluation impossible |

Note)
The term "evaluation impossible" indicates that the blister formation was too serious to determine the image quality and the surface gloss.

It is apparent from the results shown above that by forming the polypropylene resin layer on both surfaces of the base paper and selecting the melting point of the polyolefin resin forming the polyolefin resin layers and the thickness of the polyolefin resin layers are selected so as to satisfy the formulae (1) and (2) given below according to the present invention, the blister formation can be inhibited to obtain the electrophotographic image-receiving sheet improved in the image quality and surface gloss.

$$(mp-50)^2 \times T > 210 \quad (1)$$

$$T < 0.07 \quad (2)$$

According to the present invention, an electrophotographic image-receiving sheet capable of forming an image excellent in the quality and surface gloss even by the fixing at a high temperature can be obtained.

What is claimed is:

1. An image-receiving sheet for electrophotography, which comprises a base paper, a polypropylene resin layer formed in direct contact with both surfaces of said base paper and a toner image-receiving layer formed on one or both of said polypropylene resin layers, wherein the polypropylene resin forming said polypropylene resin layers has a melt flow rate (MFR) of 18 to 50 g/10 min and a density of at least 0.890.

2. The image-receiving sheet of claim 1, wherein said polypropylene resin forming said polypropylene resin layers has a melt flow rate (MFR) of 25 to 48 g/10 min.

3. The image-receiving sheet of claim 1, wherein said polypropylene resin forming said polypropylene resin layers has a melt flow rate (MFR) of 35 to 45 g/10 mm.

4. The image-receiving sheet of claim 1, wherein said polypropylene resin forming said polypropylene resin layers has a density of at least 0.900.

5. The image-receiving sheet of claim 1, wherein said polypropylene resin forming said polypropylene resin layers has a density of at least 0.905.

6. An image-receiving sheet for electrophotography, which comprises a base paper, polypropylene resin layers formed on both sides of said base paper and a toner image-receiving layer formed on one or both of said polypropylene resin layers, wherein the surface of said polypropylene resin layer on said toner image-receiving layer side has a surface tension of 48 dyne/cm or higher.

7. The image-receiving sheet of claim 6, wherein said surface of said polypropylene resin layer on said toner image-receiving layer side has a surface tension of 50 dyne/cm or higher.

8. The image-receiving sheet of claim 6, wherein said surface tension of 48 dyne/cm or higher is attained with an electric power for the corona discharge treatment of at least 0.06 kw/$m^2$.

9. The image-receiving sheet of claim 6, wherein said polypropylene resin forming said polypropylene resin layers has a melt flow rate (MFR) of 25 to 48 g/10 min.

10. The image-receiving sheet of claim 6, wherein said polypropylene resin forming said polypropylene resin layers has a melt flow rate (MFR) of 35 to 45 g/10 min.

11. The image-receiving sheet of claim 6, wherein said polypropylene resin forming said polypropylene resin layers has a density of at least 0.900.

12. The image-receiving sheet of claim 6, wherein said polypropylene resin forming said polypropylene resin layers has a density of at least 0.905.

* * * * *